US009832378B2

United States Patent
Doepke et al.

(10) Patent No.: US 9,832,378 B2
(45) Date of Patent: Nov. 28, 2017

(54) EXPOSURE MAPPING AND DYNAMIC THRESHOLDING FOR BLENDING OF MULTIPLE IMAGES USING FLOATING EXPOSURE

(71) Applicant: Apple Inc., Cupertino, CA (US)

(72) Inventors: Frank Doepke, San Jose, CA (US);
Marius Tico, Mountain View, CA (US);
Ting Chen, Sunnyvale, CA (US);
Yongfang Liang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 789 days.

(21) Appl. No.: 13/911,243

(22) Filed: Jun. 6, 2013

(65) Prior Publication Data

US 2014/0362173 A1   Dec. 11, 2014

(51) Int. Cl.
*H04N 5/232* (2006.01)

(52) U.S. Cl.
CPC ................................ *H04N 5/23238* (2013.01)

(58) Field of Classification Search
CPC ....................................................... H04N 7/00
See application file for complete search history.

(56) References Cited

U.S. PATENT DOCUMENTS

| 5,237,413 | A | 8/1993 | Israelsen |
| 6,075,905 | A | 6/2000 | Herman |
| 6,094,215 | A | 7/2000 | Sundahl |
| 6,167,404 | A | 12/2000 | Morcos |
| 6,243,103 | B1 | 6/2001 | Takiguchi |
| 6,304,284 | B1 | 10/2001 | Dunton |

(Continued)

FOREIGN PATENT DOCUMENTS

| CN | 101158889 A | 4/2008 |
| CN | 101228477 A | 7/2008 |

(Continued)

OTHER PUBLICATIONS

Efros, Alexei. "Image Blending and Compositing." Computational Photography, CMU, Fall 2010. pp. 1-82.

(Continued)

*Primary Examiner* — Gims Philippe
*Assistant Examiner* — Maryam Nasri
(74) *Attorney, Agent, or Firm* — Blank Rome LLP

(57) ABSTRACT

Special blend operations for wide area-of-view image generation utilizing a "floating auto exposure" scheme are described. Pixel values in the two images being stitched together are blended within a transition band around a "seam." identified in the overlap region between the images after changes in exposure and/or color saturation are accounted for. In some embodiments, changes in exposure and/or color saturation are accounted for through the use of one or more exposure mapping curves, the selection and use of which are based, at least in part, on a determined "Exposure Ratio" value, i.e., the amount that the camera's exposure settings have deviated from their initial capture settings. In other embodiments, the Exposure Ratio value is also used to determine regions along the seam where either: alpha blending, Poisson blending—or a combination of the two—should be used to blend in the transitional areas on each side of the seam.

23 Claims, 13 Drawing Sheets

(56) References Cited

U.S. PATENT DOCUMENTS

| | | |
|---|---|---|
| 6,978,052 B2 | 12/2005 | Beged-Dov |
| 7,006,124 B2 | 2/2006 | Peleg |
| 7,409,105 B2 | 8/2008 | Jin |
| 7,424,218 B2 | 9/2008 | Baudisch |
| 7,460,730 B2 | 12/2008 | Pal |
| 7,577,314 B2 | 8/2009 | Zhou |
| 7,590,335 B2 | 9/2009 | Kobayashi |
| 7,627,225 B2 | 12/2009 | Shimosato |
| 7,656,428 B2 | 2/2010 | Trutna |
| 7,656,429 B2 | 2/2010 | Larson |
| 7,746,404 B2 | 6/2010 | Deng |
| 7,796,871 B2 | 9/2010 | Park |
| 7,844,130 B2 | 11/2010 | Dong |
| 7,912,337 B2 | 3/2011 | Souchard |
| 1,310,987 A1 | 5/2011 | Bhogal |
| 1,310,988 A1 | 5/2011 | Doepke |
| 1,310,994 A1 | 5/2011 | Doepke |
| 1,315,114 A1 | 6/2011 | Doepke |
| 8,121,809 B2 | 2/2012 | Mealy |
| 1,348,995 A1 | 6/2012 | Tico |
| 1,349,018 A1 | 6/2012 | Tico |
| 8,285,079 B2 | 10/2012 | Robertson |
| 8,310,522 B2 | 11/2012 | Jeong |
| 8,311,355 B2 | 11/2012 | Brunner |
| 8,379,054 B2 | 2/2013 | Katayama |
| 1,391,124 A1 | 6/2013 | Doepke |
| 8,957,944 B2 | 2/2015 | Doepke |
| 2002/0126913 A1 | 9/2002 | Kotake |
| 2002/0141002 A1* | 10/2002 | Takano .............. H04N 9/045 358/513 |
| 2002/0196353 A1* | 12/2002 | Nakahira .............. H04N 5/20 348/243 |
| 2004/0001639 A1* | 1/2004 | Ohno .............. G06T 5/007 382/254 |
| 2004/0066449 A1 | 4/2004 | Givon |
| 2004/0155968 A1 | 8/2004 | Cheatle |
| 2004/0201705 A1 | 10/2004 | Lin |
| 2004/0233274 A1 | 11/2004 | Uyttendaele |
| 2005/0088534 A1* | 4/2005 | Shen .............. H04N 1/3876 348/218.1 |
| 2005/0168593 A1 | 8/2005 | Akizuki |
| 2006/0114363 A1 | 6/2006 | Kang |
| 2006/0115181 A1 | 6/2006 | Deng |
| 2006/0215930 A1 | 9/2006 | Terui |
| 2006/0224997 A1 | 10/2006 | Wong |
| 2006/0268130 A1 | 11/2006 | Williams |
| 2006/0280429 A1* | 12/2006 | Shimosato ......... H04N 1/32112 386/209 |
| 2006/0291747 A1 | 12/2006 | Peterson |
| 2007/0019882 A1 | 1/2007 | Tanaka |
| 2007/0025723 A1 | 2/2007 | Baudisch |
| 2007/0081081 A1 | 4/2007 | Cheng |
| 2007/0085913 A1 | 4/2007 | Ketelaars |
| 2007/0097266 A1 | 5/2007 | Souchard |
| 2007/0236513 A1 | 10/2007 | Hedenstroem |
| 2007/0237421 A1 | 10/2007 | Luo |
| 2007/0237423 A1 | 10/2007 | Tico |
| 2007/0258656 A1 | 11/2007 | Arabi |
| 2008/0056612 A1 | 3/2008 | Park |
| 2008/0215286 A1 | 9/2008 | Mealy |
| 2008/0253685 A1 | 10/2008 | Kuranov |
| 2008/0309772 A1 | 12/2008 | Ikeda |
| 2009/0021576 A1 | 1/2009 | Linder |
| 2009/0058989 A1 | 3/2009 | Kim |
| 2009/0190803 A1 | 7/2009 | Neghina |
| 2009/0208062 A1 | 8/2009 | Sorek |
| 2009/0231447 A1 | 9/2009 | Paik |
| 2009/0244404 A1 | 10/2009 | Park |
| 2010/0053303 A1 | 3/2010 | Hayashi |
| 2010/0054628 A1 | 3/2010 | Levy |
| 2010/0097442 A1 | 4/2010 | Lablans |
| 2010/0097444 A1 | 4/2010 | Lablans |
| 2010/0141737 A1 | 6/2010 | Li |
| 2010/0165087 A1 | 7/2010 | Corso |
| 2010/0188579 A1 | 7/2010 | Friedman |
| 2010/0309336 A1 | 12/2010 | Brunner |
| 2010/0328512 A1 | 12/2010 | Davidovici |
| 2011/0002544 A1 | 1/2011 | Oshima |
| 2011/0043604 A1 | 2/2011 | Peleg |
| 2011/0058014 A1 | 3/2011 | Yamashita |
| 2011/0058015 A1 | 3/2011 | Moriyama |
| 2011/0110605 A1 | 5/2011 | Cheong |
| 2011/0116767 A1 | 5/2011 | Souchard |
| 2011/0129126 A1 | 6/2011 | Begeja |
| 2011/0141227 A1 | 6/2011 | Bigioi |
| 2011/0141300 A1 | 6/2011 | Stec |
| 2011/0157386 A1 | 6/2011 | Ishii |
| 2011/0216156 A1 | 9/2011 | Bigioi |
| 2011/0234750 A1 | 9/2011 | Lai |
| 2011/0267544 A1 | 11/2011 | Mei |
| 2011/0304688 A1 | 12/2011 | Ge |
| 2012/0076358 A1 | 3/2012 | Meadow |
| 2012/0133639 A1 | 5/2012 | Kopf |
| 2012/0155786 A1 | 6/2012 | Zargarpour |
| 2012/0169840 A1 | 7/2012 | Yamashita |
| 2012/0229595 A1 | 9/2012 | Miller |
| 2012/0263397 A1 | 10/2012 | Kimura |
| 2012/0274739 A1 | 11/2012 | Li |
| 2012/0293607 A1 | 11/2012 | Bhogal |
| 2012/0293608 A1 | 11/2012 | Doepke |
| 2012/0314945 A1 | 12/2012 | Cha |
| 2013/0004100 A1 | 1/2013 | Putraya |
| 2013/0033568 A1 | 2/2013 | Kim |
| 2013/0063555 A1 | 3/2013 | Matsumoto |
| 2013/0236122 A1 | 9/2013 | Drouot |

FOREIGN PATENT DOCUMENTS

| | | |
|---|---|---|
| CN | 101379513 A | 3/2009 |
| CN | 101600113 A | 12/2009 |
| CN | 101668118 A | 3/2010 |
| CN | 102037719 A | 4/2011 |
| EP | 0592136 | 4/1994 |
| EP | 1940152 A2 | 12/2006 |
| EP | 2018049 A2 | 1/2009 |
| JP | 2009290827 A | 12/2009 |
| JP | 2011066635 A | 3/2011 |
| WO | 9951027 A1 | 10/1999 |
| WO | 2004049257 A2 | 6/2004 |
| WO | 2006048875 A2 | 5/2006 |
| WO | 2009094661 | 7/2009 |
| WO | 2010025309 A1 | 3/2010 |
| WO | 2011033968 A1 | 3/2011 |
| WO | 2011039904 A1 | 4/2011 |

OTHER PUBLICATIONS

Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.

"Rendering by Manifold Hopping." Submitted to Siggraph '2001, Paper No. 194, Catgory: research. pp. 1-10.

McCann, James, Nancy S. Pollard. "Real-Time Gradient-Domain Painting." Computer Science Department, http://repository.cmu.edu/compsci/1257.

Perez, P., Gangnet, M., and Blake, A., 'Poisson Image Editing,' ACM Transactions on Graphics (TOG) Proceedings of ACM SIGGRAPH 2003, vol. 22, iss. 3, pp. 313-318, Jul. 2003.

Methods of Adaptive Image Blending and Artifacts Masking for Panorama Creation. Apple. Inc. Camera Algorithm Team. Technical Report TR-2012-001.

Xiong, Yingen and Pulli, Kari, "Fast Panorama Stitching for High-Quality Panoramic Images on Mobile Phones," IEEE Transactions on Consumer Electronics, vol. 56, No. 2, May 2010, pp. 298-306.

Cha, Joon-Hyuk, et al., "Seamless and Fast Panoramic Image Stitching," 2012 IEEE International Conference on Consumer Electronics (ICCE), pp. 29-30.

'Panoramic Image Projections', http://www.cambridgeincolour.com/tutorials/image-projections.htm, 9 pages, May 12, 2011.

(56) References Cited

OTHER PUBLICATIONS

'Photo Stitching Digital Panoramas', http://www.cambridgeincolour.com/tutorials/digital-panoramas.htm, 11 pages, May 12, 2011.
'Using Photo Stitching Software', http://www.cambridgeincolour.com/tutorials/photo-stitching-software.htm, 9 pages, May 12, 2011.
International Search Report and Search Opinion for PCT Application No. PCT/US2012/033010, dated Jun. 19, 2012, 9 pages.
Joshi, Neei, et al., 'Image Deblurring using Inertial Measurement Sensors', ACM SIGGRAPH, New York, NY, 8 pages, Jul. 2010.
PCT Search Report and Search Opinion for PCT Application No. PCT/US2012/034625, dated Jul. 31, 2012, 10 pages.
"Filter," In "The IEEE Standard Dictionary of Electrical and Electronics Terms—Sixth edition—IEEE Std 100-1996," 1997, IEEE, ISBN: 1-55937-833-6, pp. 408-409.

\* cited by examiner

EXPOSURE MAPPING AND DYNAMIC THRESHOLDING FOR BLENDING OF MULTIPLE IMAGES USING FLOATING EXPOSURE

CROSS-REFERENCE TO RELATED APPLICATIONS

This application is related to the commonly-assigned U.S. patent application having Ser. No. 13/489,950, filed Jun. 6, 2012, and entitled, "Image Blending Operations" ("the '950 application") and the commonly-assigned U.S. patent application having Ser. No. 13/490,183, filed Jun. 6, 2012, and entitled, "Adaptive Image Blending Operations" ("the '183 application"), each of which applications is hereby incorporated by reference in its entirety.

BACKGROUND

This disclosure relates generally to the field of image processing and, more particularly, to various blending techniques for use in generating wide area-of-view images constructed by stitching together individual image slices having varying exposures.

One conventional method to generate a wide area-of-view image from a sequence of images (frames) is illustrated in FIG. 1. To begin, a sequence of frames is captured (block 100), e.g., frames 1 through 3 shown in FIG. 1. The frames are then registered (block 105), identifying the regions of overlap between successive frames region 110 between frames 1 and 2, and region 115 between frames 2 and 3). As will be explained herein, in certain embodiments, it may be advantageous to only utilize and register the central regions of the images in the construction of a wide area-of-view image. These central regions may be referred to herein as image "slices" or image "slits." In some preferred embodiments, the image slices may comprise the central one-eighth portion of the image frame, but any suitable slice size may be chosen for a given implementation. Once regions 110 and 115 have been specified, a path or seam is identified through each region (block 120). Here, seam 125 (through region 110) and seam 130 (through region 115) have been identified in FIG. 1. In accordance with standard scene-cut algorithms, seams 125 and 130 are generally selected to pass through the most similar pixels between each image found in their respective overlap region (i.e., frames 1 and 2 in region 110 and frames 2 and 3 in region 115). As a result, seams 125 and 130 are typically placed outside of, but immediately adjacent to, moving objects within the respective overlap region. With seams 125 and 130 identified, a blend operation across each is performed (block 135); the result of which is final wide area-of-view image 140.

The role of blending operation 135 is to mask or obfuscate the differences or transition between two frames. One approach to do this uses a process known as "gradient domain" blending, which consists of constructing the gradient field of final image 140 by copying the gradient fields of each image on the corresponding sides the identified seam (e.g., referring to identifier 145, the gradient fields across seam 125 would be gradient field A from frame 1 and gradient field B from frame 2). Once this is done, the final image is generated by integrating over the gradients across the seam. Reconstructing final wide angle-of-view image from its gradient fields requires substantial computational resources (e.g., to solve Poisson partial differential equations)—resources that may not permit for the satisfactory real-time generation of wide angle-of-view images on common hand-held devices such as, for example, personal electronic devices having embedded image sensors such as mobile telephones, personal music players, tablet computer systems, and personal gaming devices. Gradient domain blending may also be unable to mask registration errors visible along objects that span multiple frames.

Another approach, referred as "image cross-fading," seeks to mask the transition between two frames by cross-fading pixel values from each frame along the transition seam (e.g. 125 and 130). This generally consists of a technique known as "alpha blending," which comprises calculating a weighted average between the corresponding pixel values in the two frames, where the weight given to each pixel decreases smoothly while approaching the seam and vanishes at some distance after passing the seam. For example, the weight given to each pixel from frame 1 in region 110 can decrease smoothly from 1 to 0 while crossing seam 125 from left to right. Similarly, the weight given each pixel from frame 2 in region 110 can decrease smoothly from 1 to 0 while crossing seam 125 from right to left. Exactly on seam 125, pixels from both frame 1 and frame 2 may have the same weight, e.g., 0.5.

Reconstructing a final wide angle-of-view image using image cross-fading techniques alone can result in both "ghosting artifacts" (manifested by preserving parts of a moving object that is close to a transition seam) and banding artifacts (manifested in smooth areas in the images such as sky, constant color walls and fine textures). Likewise, using Poisson blending techniques alone can result in problems within regions of the reconstructing final wide angle-of-view image where, for instance, there are "broken" objects (e.g., a long object that is broken across individual image slices because of problems in the image registration process). Finally, in order to more fully capture image details in a wide angle-of-view image with varying brightness levels across the extent of the wide angle-of-view image, the auto exposure settings of the camera must be allowed to change or 'drift' during the capture process, preferably within some predefined bounds.

Thus, the inventors have realized new and non-obvious ways to constrain this auto exposure drift process and harness the information provided from the auto exposure drift process in order to more effectively account and correct for changes in the camera's exposure settings across consecutive image slices and blend across consecutive image slices without producing noticeable exposure banding artifacts, while still preserving maximum image detail.

SUMMARY

In one embodiment, the inventive concept provides a method to more effectively blend two images in an operation referred to herein as "on-the-fly exposure mapping" for high dynamic range, wide area-of-view image construction, e.g., panoramic image construction. In this embodiment, the exposure settings of the camera are allowed to "float" or "drift" within a predefined range. For any given captured image slice in a wide area-of-view image that is being constructed, the ratio of the exposure value for the given captured image slice to the exposure value of an initial captured image slice of the wide area-of-view image may be determined and associated with the given captured image slice. This ratio, referred to herein as an "Exposure Ratio" value or "ER," may then be used—in conjunction with one or more exposure mapping curves—to boost or lower the exposure (e.g., luma values) of the given captured image slice to the initial captured image slice of the wide area-ofview image. The mapping curves may be used to retain highlights and/or shadows in the given captured image slice, while matching the midtones of the given captured image slice to the initial captured image slice, so as to avoid overly jarring changes in brightness between image slices. In this way, the information gained by the exposure adjustment during the capture of the wide area-of-view image may be retained, while maintaining the overall image brightness balance that allows the slices to be blended together in a visually pleasing manner.

In other embodiments according to the "on-the-fly exposure mapping" techniques described herein, the saturation levels of the colors values (e.g., chroma values) of the given captured image slice may also be adjusted (e.g., scaled) based, at least in part, on the determined Exposure Ratio value for the slice and the lama values of the pixels in the slice. This may help to prevent coloration problems from occurring in newly captured image slices as the exposure settings of the camera change, e.g., to prevent get overly yellowish colors when moving the camera from a bluish region of the scene that is being captured to a more yellowish region of the scene that is being captured.

In another embodiment of the inventive concept referred to herein as "dynamic thresholding based on exposure ratio" for high dynamic range, wide area-of-view image construction, the method includes obtaining first and second images (or image slices), preferably images (or image slices) that the "on-the-fly exposure mapping" techniques described above have already been applied to. The method then identifies an overlap region between the two, where the overlap region has identified therein a seam and guard-band borders demarcating a "transition band." For each seam pixel, a value may be determined based, at least in part, on the values of the corresponding pixels from the first and second images and a known exposure setting difference between the first and second images. These determined values may then be used to determine a "cost image" in the overlap region. The path of the seam within the overlap region may be then identified in a manner so as to minimize the associated cost in the cost image. The two images are then matched across the image seam by blending together the pixels in the transition band.

In such an embodiment, the image seam-matching process may comprise one or more weighted blending operations such as, for example, "alpha blending" and "Poisson blending." The weighting between the different blending techniques may be based on a number of factors including, but not limited to, the images' content within the transition band (e.g., whether moving objects exist or whether there are long contiguous objects passing thought the overlap region) and the magnitude of the difference of the corresponding pixels from the first and second images in the transition band. In some embodiments, when a large difference between corresponding pixel values from the first and second images is detected, the alpha blending approach will be favored; whereas, when a small difference between corresponding pixel values from the first and second images is detected, the Poisson blending approach will be favored.

In still other embodiments, the methods described herein may be implemented via computer executable program code. In still other embodiments the disclosed methods may be implemented in systems, such as electronic devices having image capture capabilities.

DETAILED DESCRIPTION

Figure 1:
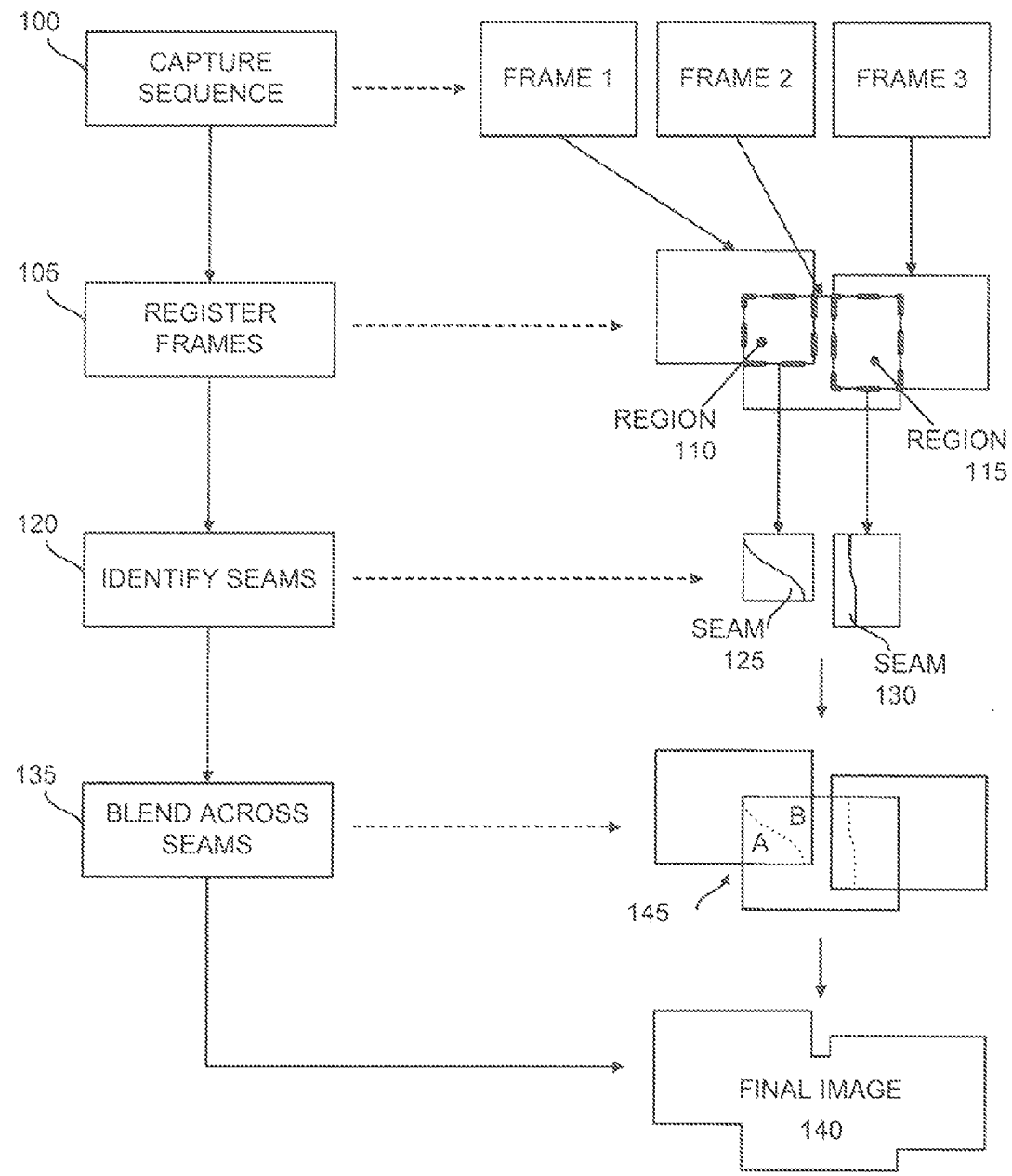
FIG. 1 shows, in flowchart and block diagram form, a wide area-of-view image generation operation in accordance with the prior art.

This disclosure pertains to systems, methods, and computer readable media for blending multiple images for use in generating high dynamic range, wide area-of-view, images using an operation referred to as "image seam-matching" while leveraging novel "on-the-fly exposure mapping" techniques. Image seam-matching seeks to make the pixel values in the two images being blended equal along their transition border or seam, and smoothly increases/decreases pixel values on either side of the seam through the images' transition hand. "On-the-fly exposure mapping" techniques attempt to account for shifts in a camera's exposure settings during the capture of images in the construction of a wide area-of-view image.

This disclosure also pertains to systems, methods, and computer readable media for blending multiple images for use in generating wide area-of-view images using an operation referred to as "dynamic thresholding based on exposure ratio." Prior to the use of floating auto exposure in the generation of wide area-of-view images, if corresponding pixels didn't match well between consecutive image slices, it was a good assumption that the poor matching was due to a moving object within the overlap region between the images. With the use of floating auto exposure, however, if there is poor matching between the corresponding pixels of consecutively capture image slices, it is difficult to determine if the mismatching is due to a moving object in the overlap region or, rather, a difference in exposure from one image slice to the next. With the use of the Exposure Ratio variable, the known change in exposure for the currently captured image slice can be accounted for—in other words, a "reverse" tone mapping operation may be performed. Then, whatever amount of pixel difference remains between the corresponding pixels may be assumed to be due to the movement of an object(s) within the overlap region. This difference may then be accounted for in the blending operation by intelligently weighting between different blending operations along the identified seam and within the transition band.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Figure 2:
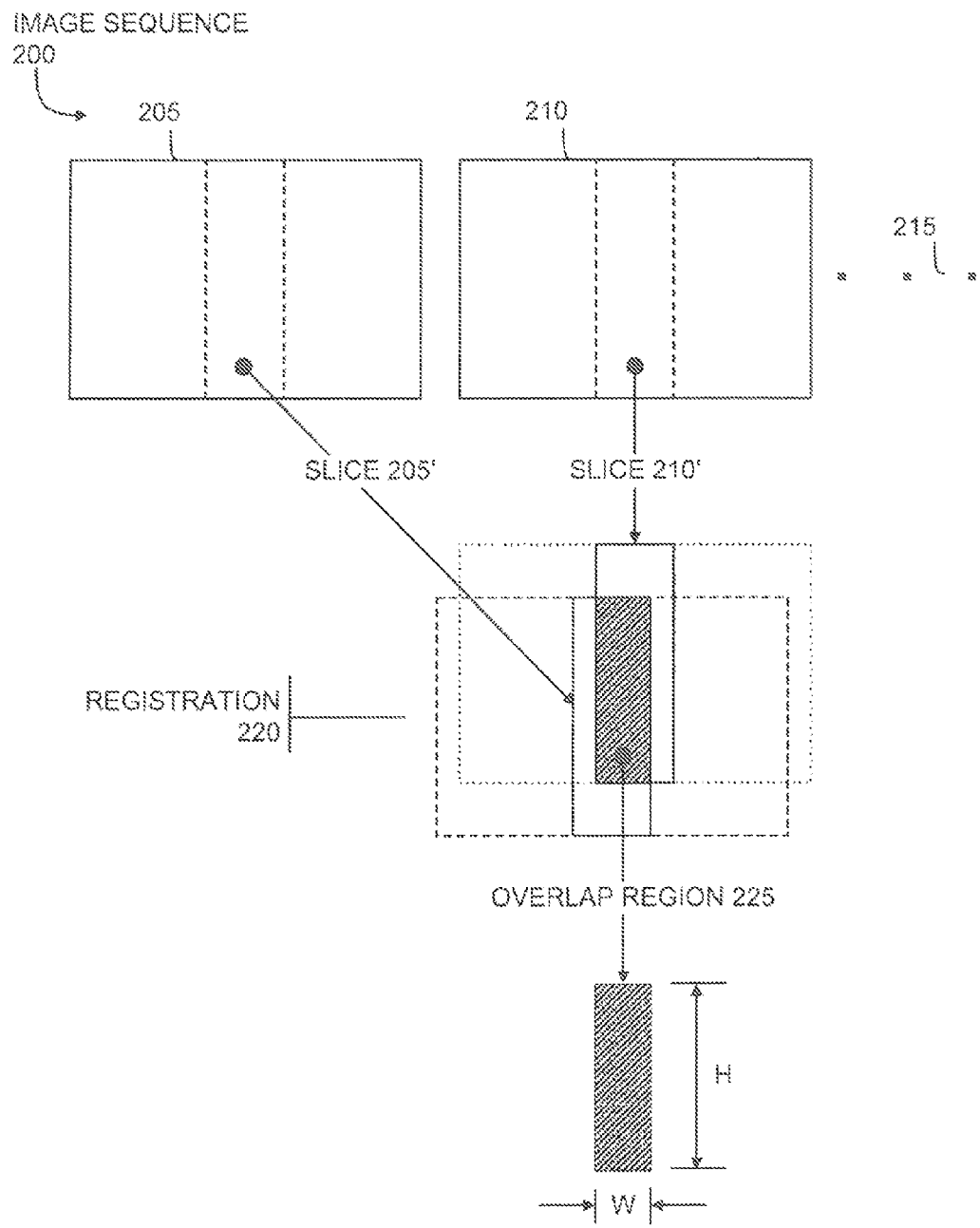
FIG. 2 shows, in block diagram form, identification of an overlap region in accordance with one embodiment.

Referring to FIG. 2, image sequence 200 includes full-size frame 205, full-size frame 210, and zero or more additional frames (designated by ellipse 215). In one embodiment, thin strips may be identified in each frame (e.g., slices 205' and 210') and used during registration operation 220 (which may include, for example, rotation, scaling, translation, affine and fully projective operations, or combinations thereof). As part of registration operation 220, overlap region 225 may be identified. To simplify the following, it is assumed that overlap region 225 is a rectangular area having a height of H pixels and a width of W pixels. Full size frames 205-215 may be substantially any size. For example, an implementation for image capture devices providing 5 Mpix full-size images (having a width of 1956 pixels and a height of 2592 pixels), may use a slice that is 240-by-2592 pixels. In like fashion, implementations using a 2 Mpix image capture device (providing images having a width of 1200 pixels and a height of 1600 pixels), may use a slice that is 200-by-1600 pixels.

It will be understood that, when generating wide area-of-view images, the surrounding scene may be captured as it would be projected onto an imaginary cylindrical manifold. As such, the individual frames forming the wide area-of-view image may be projected onto this cylindrical manifold before being blended into the final image. Thus, while the precise dimensions of a slice are unimportant (e.g., 205' or 210'), in some embodiments it may be significant that the slice is much larger in one dimension (e.g., height) than it is in the other dimension (e.g., width). In embodiments in which this holds, the slices may be concatenated to approximate the cylindrical projection of the captured frames. By doing this, cylindrical warping operations may be avoided (a computationally intensive process necessary to compensate for image distortions when large slices or whole frames are registered in accordance with the prior art). Additional details regarding cylindrical projection techniques in the context of the capture of wide area-of-view images may be found in the incorporated '950 application and '183 application.

Figure 3A:
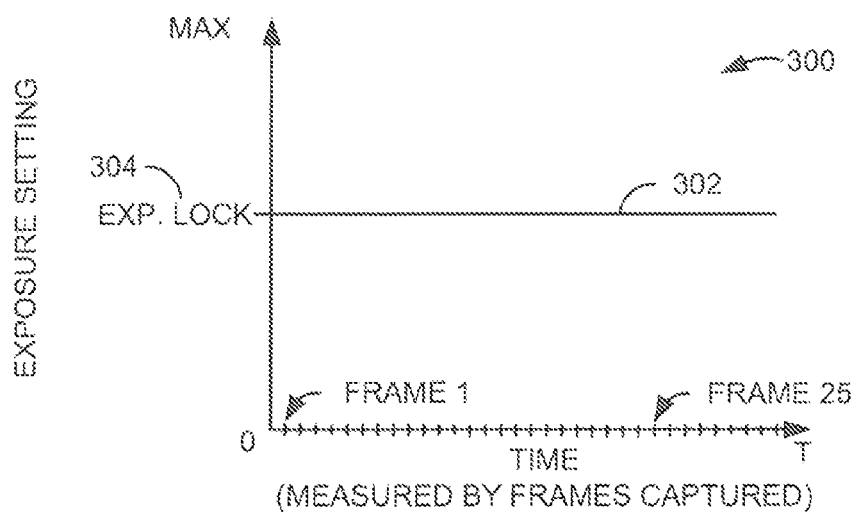
FIGS. 3A-3C show: a locked exposure scheme, a floating auto exposure scheme, and a floating auto exposure scheme with locking, respectively.

Referring now to FIG. 3A, a graph 300 representing a prior art "locked exposure" scheme is shown. In graph 300, the y-axis represents the value of the camera's exposure parameter, e.g., as measured in f-stops. The x-axis in graph 300 represents the passage of time, as measured by consecutively captured image frames, e.g., frames that will be used in the construction of a wide area-of-view image. As shown in graph 300, the camera's exposure value 302 is locked at predetermined exposure lock value 304. Exposure lock value 304 may be determined, e.g., by the initial frame captured by the camera at the beginning of the wide area-of-view image capture process, or may be pre-specified by the user in some other manner, such as by pointing the camera at a scene of desired brightness levels and indicating that the exposure settings of the camera when pointed at the scene of desired brightness should be used as the exposure lock value 304. Prior art "locked exposure" schemes, such as those described in the '950 application and '183 application have the advantage that the exposure levels of the images slices are guaranteed to match from slice to slice, and, thus, any difference in the overlap region between consecutive slices may be attributed to differences in image composition. The downside to such a "locked exposure" scheme, however, is a loss of image detail as the brightness of the scene being captured changes across the span of the wide area-of-view image.

Figure 3B:
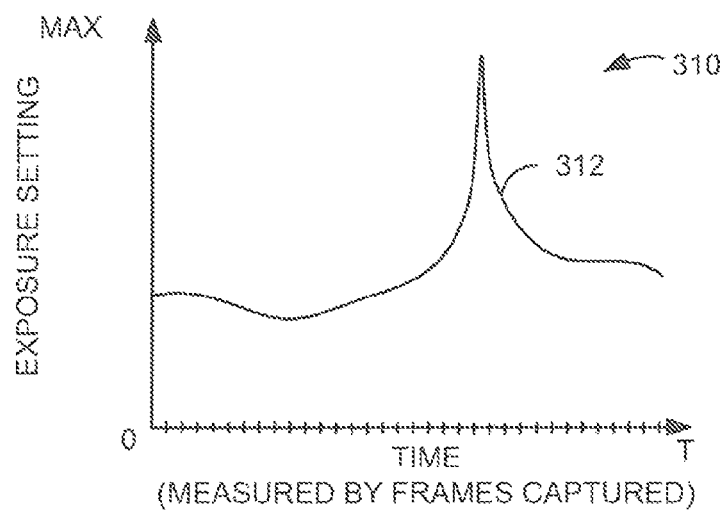

FIG. 3B shows a graph 310 representing a prior art "floating auto exposure" scheme. As in graph 300, the y-axis in graph 310 represents the value of the camera's exposure parameter, and the x-axis represents the passage of time, as measured by consecutively captured image frames. As shown in graph 310, the camera's exposure value 312 is allowed to "float" freely over a wide range of exposure values with no hounding. Prior art "floating auto exposure" schemes have the advantage that image details are consistently captured as the brightness of the scene being captured changes across the span of the wide area-of-view image. The downside to such a "floating auto exposure" scheme, however, is a loss of the ability to seamlessly blend between consecutive slices as the exposure levels of the images slices drift from slice to slice, thus making it harder to align the overlap regions between consecutive slices.

Figure 3C:
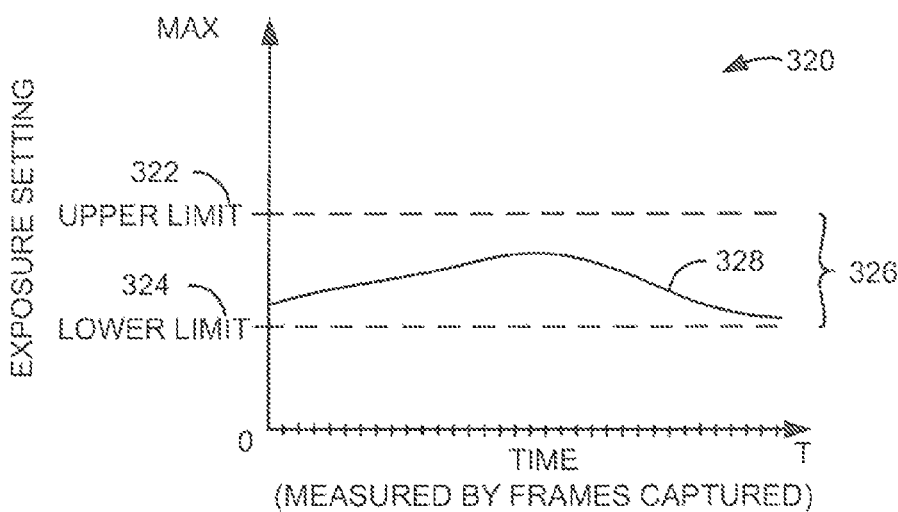

FIG. 3C shows a graph 320 representing a novel "floating auto exposure with locking" scheme. As in graphs 300 and 310, the y-axis in graph 320 represents the value of the camera's exposure parameter, and the x-axis represents the passage of time, as measured by consecutively captured image frames. As shown in graph 320, the camera's exposure value 328 is allowed to "float," but only between upper limit 322 and lower limit 324, within hounding envelope 326. Such a technique may have the advantage that image details are more satisfactorily captured as the brightness of the scene being captured changes across the span of the wide area-of-view image, but the amount of change in the camera's exposure value is governed such that the blending operation is still able to successfully blend between consecutive slices as the exposure levels of the images slices drift from slice to slice without being overly visually jarring.

Figure 4:
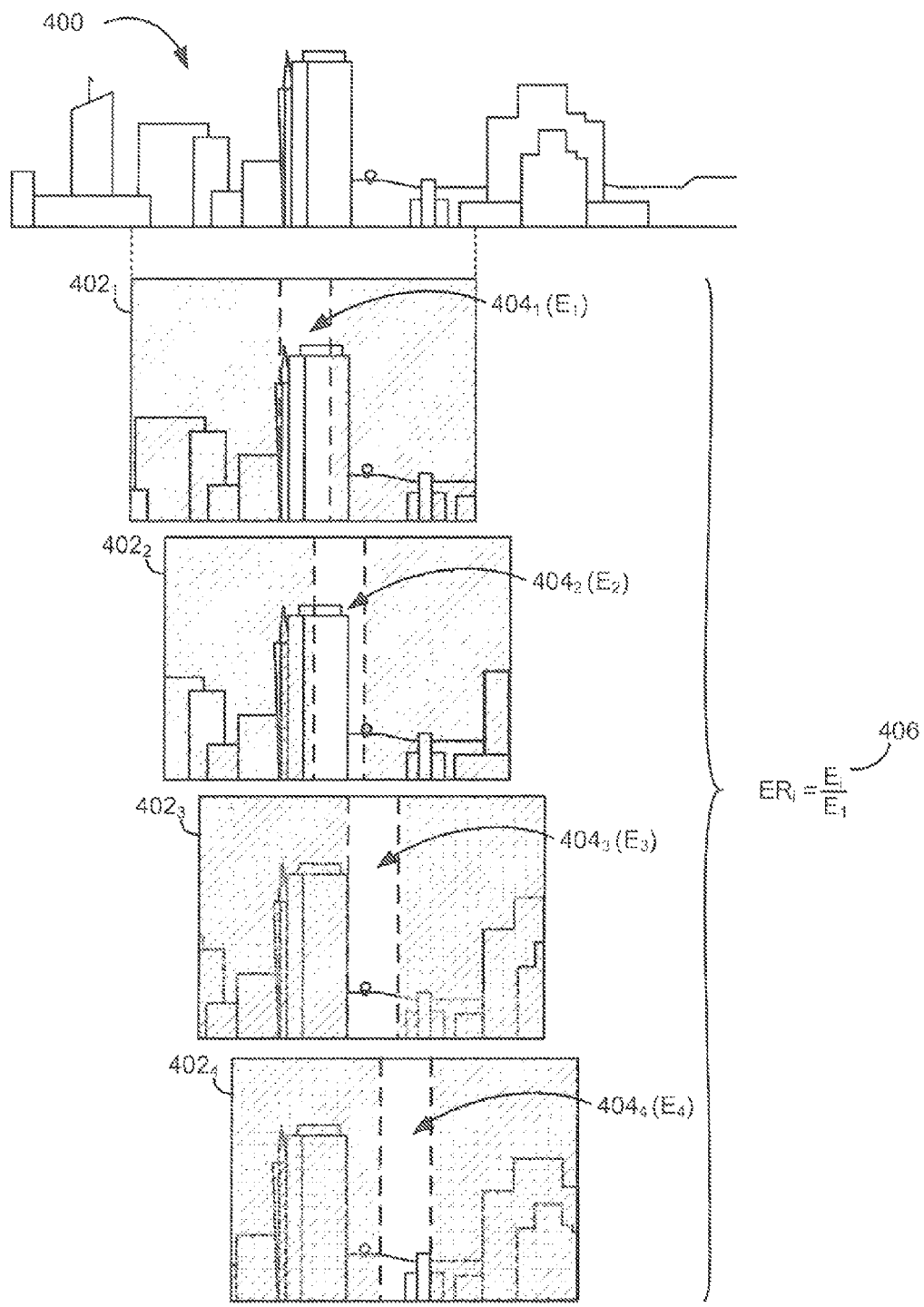
FIG. 4 shows exemplary image slices and the calculation of an Exposure Ratio value, in accordance with various embodiments.

Referring now to FIG. 4, exemplary image slices and the calculation of an Exposure Ratio value are shown, in accordance with various embodiments. In FIG. 4, scene 400 represents the subject matter that a user is attempting to capture in a wide area-of-view image. Frames 402 are captured chronologically in consecutive order, and are labeled $402_1$, $402_2$, and so forth. The corresponding central portions, i.e., slices, of the image frames are labeled $404_1$, $404_2$, and so forth. In some embodiments, only these slices 404 are used in the image blending process and the construction of the final wide area-of-view image, and the cross-hatched portions of image frames 402 may be discarded. Attached to each image slice 404 is a corresponding exposure value, labeled $E_1$, $E_2$, and so forth. These values reflect the exposure settings of the camera at the time of capture of the corresponding image slice. An exemplary equation 406 is shown that may be used for the determination of the aforementioned "Exposure Ratio" value. In one embodiment, the "Exposure Ratio" (ER) value for a given frame, i, may be calculated according to the equation:

$ER_i = (E_i/E_1)$, where $E1$ is the exposure value of the initial captured image portion  (EQ. 1)

In some embodiments employing a "floating auto exposure with locking" the range of possible camera exposure parameters may be locked to within 1.5 f-stops from the camera's exposure value at the capture of the initial image portion of the wide area-of-view image, i.e., E1. As may be understood, the more that the exposure value is allowed to drift, the greater the dynamic range is that may be captured in the wide area-of-view image. However, if the exposure difference is too large, then the resulting de area-of-view image will exhibit reduced bit depth in the resulting blended image, effectively "posterizing" the image, pushing a large number of pixels into the same "bucket" in the output mapped image.

"On-the-Fly Exposure Mapping"

As mentioned above, one potential problem with "locked exposure" schemes is that, when a user starts panning a scene, if he or she moves toward something brighter or darker, the image may either end up being overexposed or underexposed. By calculating an "Exposure Ratio" that changes as the user pans the camera, the captured image slices may be brought in towards the exposure of the initial slice so that the later-captured slices would more closely match in brightness.

The inventors have surprisingly discovered that the exposure compensation process is further improved when the images are mapped at the individual pixel level, and wherein every pixel is not mapped in the same way. To implement this per-pixel mapping approach, one embodiment, one or more mapping curves are employed. The mapping curves may be used in an effort to capture the retained information from slice to slice while still adjusting the midtones sufficiently that there are not overly visually jarring brightness changes between consecutive slices in the resultant generated wide area-of-view image.

Figure 5:
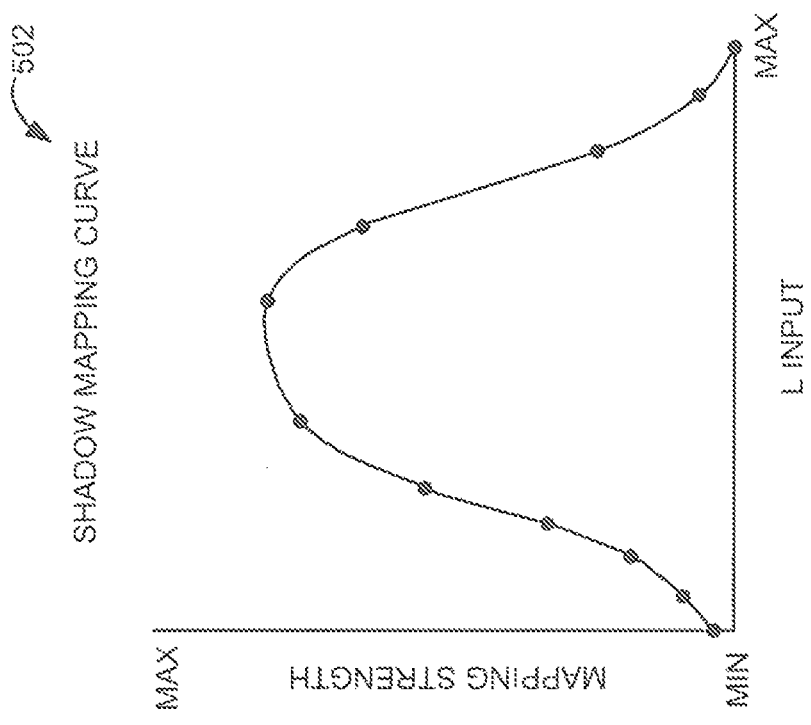
FIG. 5 illustrates exemplary exposure mapping curves for use in "on-the-fly exposure mapping" techniques, in accordance with various embodiments.
Figure 5:
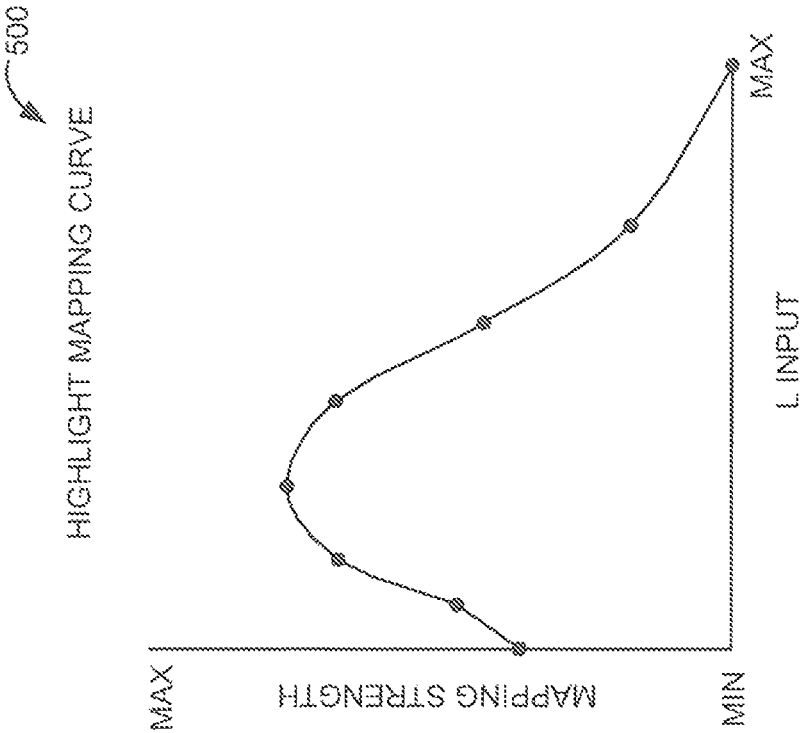

Referring now to FIG. 5, exemplary exposure mapping curves for use in "on-the-fly exposure mapping" techniques are shown, accordance with various embodiments. The x-axes on the graphs in FIG. 5 represent the input luma values, whereas the y-axes represent the mapping strength, which is used as the power to the exposure ratio by which the luma value will be scaled. The highlight mapping curve 500 tapers off in the brighter portions, and therefore keeps that information retained after the mapping process, while the overall slice brightness is matched so that the consecutive slices can be fused together successfully. Shadow mapping curve 502 attempts to avoid losing all shadow details, but needs to be shaped a bit differently from highlight mapping curve 500 in order to produce a more uniform look on the overall panorama. In one preferred embodiment, highlight mapping curve 500 is used for image slices with an Exposure Ratio greater than or equal to 1 (i.e., a scene that is getting brighter), and shadow mapping curve 502 is used for image slices with an Exposure Ratio less than 1 (i.e., a scene that is getting darker). Other implementations could clearly use more or less mapping curves, e.g., one mapping curve for each different kind of typical scene lighting source. In another preferred embodiment, the mapping curves are used to calculate a lookup table (LUT) so that the luma value for each pixel may be mapped more efficiently by a device's hardware and/or firmware. To map the luma value of the pixel according to one embodiment, the luma value of the pixel is multiplied with the Exposure Ratio of the image slice raised to the power of the appropriate mapping curve's output value at the luma value for the pixel.

Exemplary pseudocode for employing the "on-the-fly exposure mapping" techniques described above is give below:

If (exposureRatio >= 1.0)
    luma = luma * powf(exposureRatio, highlightMappingCurve[luma]);
else
    luma = luma * powf(exposureRatio, shadowMappingCurve[luma]);

The resulting value may then be clamped to the range of 0 to 255 (e.g., in the case of embodiments with 8-bit luma values).

In one embodiment, the exposure mapping process described above is employed as a "streaming solution," i.e., it is done in substantially real time, rather than in post processing once all the images have already been captured. According to the teachings presented herein employing a novel "Exposure Ratio" concept and utilizing only thin, central image portions, i.e., slices, in the image registration process, the exposure mapping process is thus able to be completed "on-the-fly."

Auto White Balance (AWB) Desaturation

In addition to the "on-the-fly exposure mapping" techniques described above, the inventors also realized that, if a given image capture operation starts in the shade and pans to sunnier areas, certain colors can become oversaturated in the resultant wide area-of-view image. Hence, according to one embodiment, the output from a camera's existing auto white balance (AWB) calculation unit may be leveraged in order to intelligently desaturate the chroma values in the captured image slices. In certain embodiments the AWB desaturation process may be carried out in addition to the on-the-fly exposure mapping of the pixel luma values discussed above.

According to one embodiment of an AWB desaturation process, at the beginning of the capture of the wide area-of-view image, the camera's white balance (WB) is locked. Although the WB of the camera is locked, the AWB calculation unit continues to calculate the gain for each color channel, e.g., each of the red, green, and blue channels, so that the AWB desaturation knows where the camera's AWB "wants" to adjust the camera's color channel gains. This allows for the calculation of a "delta" between the camera's current color channel gains and the gain values that the camera's AWS "wants" to adjust the color channel gains to in response to the composure of the currently-captured scene.

If both the white balance and the exposure settings of the camera have drifted off, the AWB desaturation process may use this as a factor in deciding how much to desaturate the colors. The AWB desaturation process may then calculate a scale factor by which to desaturate the colors.

Exemplary pseudocode for employing the "AWB desaturation" techniques described above is give below:

```
currentAWBDelta = fabsf(awbBlueGainDelta - awbRedGainDelta) // this
is the calculated gain vs. the applied gain.
scale = powf(currentAWBDelta / maxAWBDelta, 2.0); // maxAWBDelta
is a tuning parameter. This scale represents how much the color
temperature is 'off'
desatStrength = fminf(1.0, desatScale * scale); // this
gives another tuning point to have control over the strength of the
desaturation
if(exposureRatio >= 1.0) // the following scales the desaturation based
on how much the exposure has adjusted
    desatScale = powf(exposureRatio, desatStrength);
else
    desatScale = powf((1.0 / exposureRatio), desatStrength);
desatScale = fminf(desatScale, maxDesatStrength); // yet another tuning
parameter that allows an upper limit on the desaturation to be set
// Now each pixel's chroma may be mapped based on its luma
mapValue = (MAX(0, (float)luma - desatMappingBasePoint)) / (255.0 -
desatMappingBasePoint); // the desatMappingBasePoint allows the
process to control from which brightness level on it wants to desaturate
(i.e., it is a tuning value)
mapValue = powf(desatScale, mapValue);
desatValue = (chromaCB - 128.0) / mapValue;
chromaCB = ceilf(desatValue) + 128.0;
desatValue = (chromaCR - 128.0) / mapValue;
chromaCR = ceilf(desatValue) + 128.0;
// Example tuning parameters are:
desatMappingBasePoint = 25.0;
desatScale = 2.0;
maxAWBDelta = 0.5;
maxDesatStrength = 1.5;
```

The result of the on-the-fly exposure mapping and the additional AWB desaturation processing described herein is an incoming image slice that is close enough to its predecessor that it may be blended without significant artifacts, but wherein a greater amount of information in the incoming image slice is retained than if the system would not have allowed the camera's exposure value to change during the capture of the wide area-of-view image. These mapped pixel values may then be passed into the 'blending' stage, which will be described in greater detail below.

Figure 6:
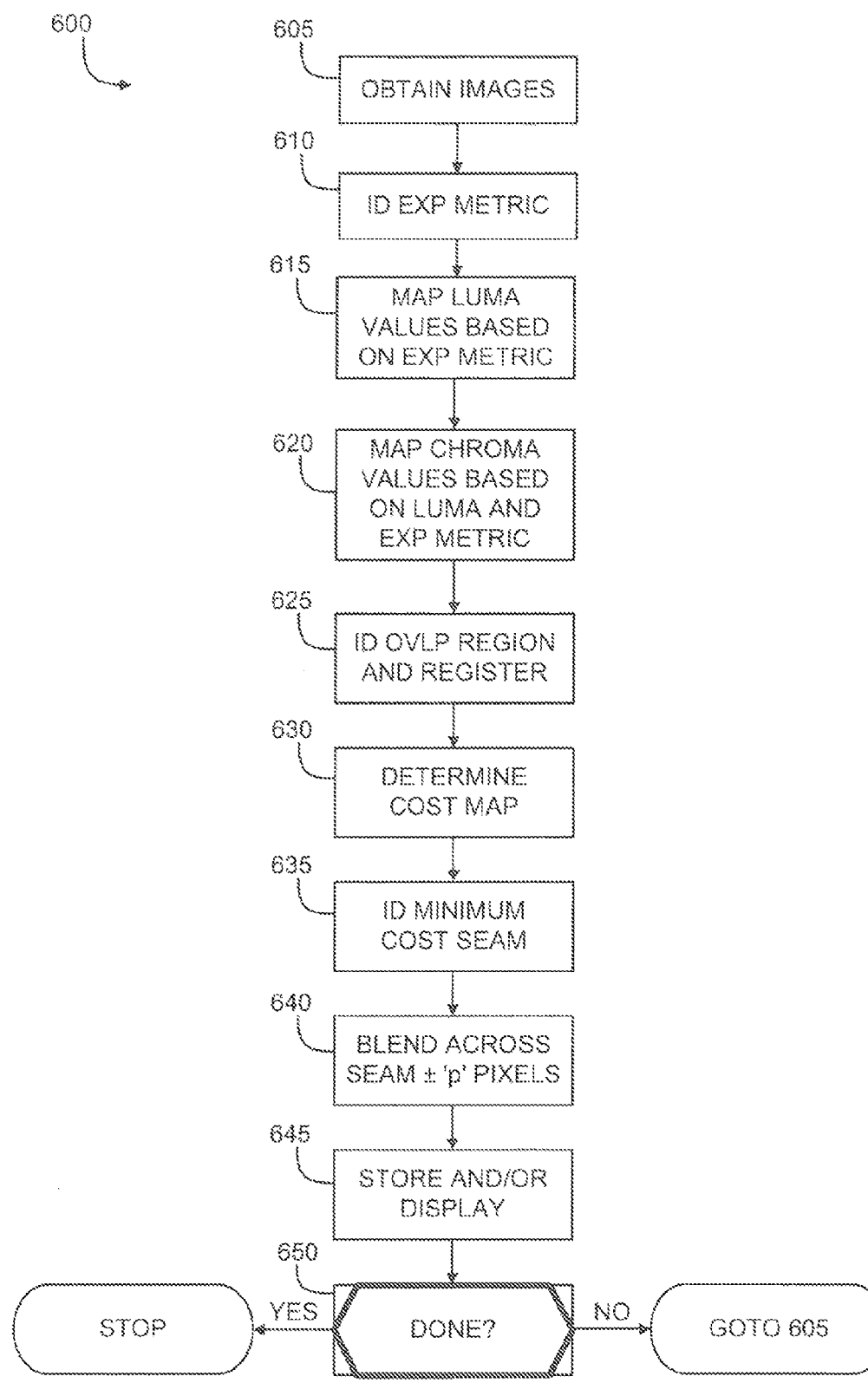
FIG. 6 shows, in flowchart form, an "on-the-fly exposure mapping" blending operation for high dynamic range, wide area-of-view image construction, in accordance with one embodiment.

Referring now to FIG. 6, "on-the-fly exposure mapping" blending operation 600 for high dynamic range, wide area-of-view image construction begins when two images (or image slices) are obtained (block 605). In one embodiment, images may be obtained directly from an image capture device or sensor. In another embodiment, images may be obtained from a secondary source (e.g., storage). An exposure metric, e.g., the aforementioned "Exposure Ratio" value may then be calculated for the most recently captured image (block 610). The luma values for the most recently captured image may then be mapped according to one or more exposure mapping curves, as described above (block 615). The chroma values for the most recently captured image may also then be desaturated based, at least in part, on the exposure metric and the luma value of the corresponding pixel, as described above (block 620). An overlap region between the two images may then be identified so that the images may be registered and a registration quality metric may be obtained (block 625). If the quality metric indicates the registration is acceptable, an initial cost map may be determined (block 630). Details regarding how the process may proceed if the quality metric indicates that the registration is not acceptable may be found in the incorporated '183 Application, and thus are not discussed further here. Based on the final cost map, a minimum cost seam can be determined (block 635). Details regarding the construction of a cost map and determination of a minimum cost seam may be found in the incorporated '950 Application and '183 Application. The two images may then be blended together by blending ±'p' overlapping pixels across the identified minimum cost seam (block 640). While the precise guardband width chosen is, of course, a design decision subject to the constraints and capabilities of the particular implementation, in one embodiment p may be 32 to 64 pixels. It should be noted that operation 600 identifies and compensates for exposure changes between images slices—as well as moving objects within the overlap region—while also selecting that seam that beneficially maintains the presentation of straight lines (edges) in the final output image. With blending operations complete, the blended image may be stored or displayed (block 645). If all desired images have been registered and blended (the "YES" prong of block 650), operation 600 is complete. If additional images remain to be combined (the "NO" prong of block 650), operation 600 continues at block 605 where the next image to be combined may be obtained.

Figure 7:
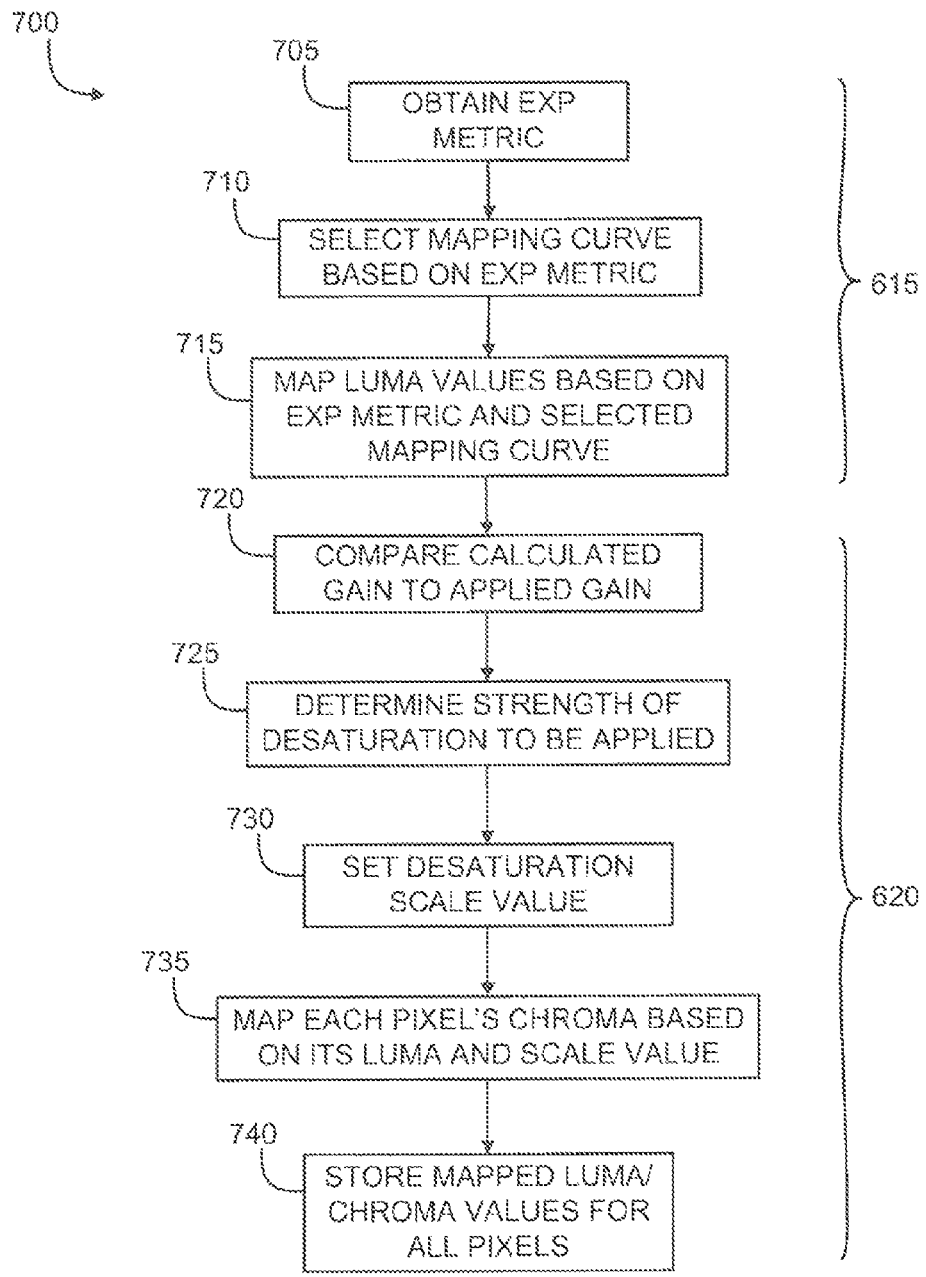
FIG. 7 shows, in flowchart form, greater detail of an "on-the-fly exposure mapping" blend operation, in accordance with one embodiment.

Referring now to FIG. 7, greater detail of an "on-the-fly exposure mapping" blend operation is given, in accordance with one embodiment. More particularly, process 700 shown in FIG. 7 represents a more detailed view of blocks 615 and 620 from FIG. 6. Beginning with the detailed view of block 615, the Exposure Ratio metric for the currently captured image slice is obtained (block 705). Next, an appropriate exposure mapping curve is selected based, at least in part, on the determined Exposure Ratio metric (block 710). The luma values of the current image she then mapped based on the selected exposure mapping curve (block 715). As mentioned above, the exposure mapping curves may be implemented as LUTs, e.g., 8-bit LUTs, to gain additional operational efficiencies. Moving on to the detailed view of block 620, assuming a "locked auto exposure" scheme, the gains for the various color channels, as calculated (but not applied) by the AWB calculation unit, are compared with the currently applied gains (block 720). Next, the process may determine an appropriate strength of desaturation to be applied to the various color channels to account for the changes in exposure level between image slices (block 725). Based on this determination, the process may then set one or more desaturation "scale factor" values that are applied to the various color channels (block 730). Finally, the chroma values for each pixel in the current image slice may be desaturated according to the determined desaturation scale factor value, and the pixel's mapped luma value (block 735). These results are then stored and used in the subsequent registration, seam determination, and blending steps described in FIG. 6. As mentioned in the pseudocode example above, various tuning parameters and clamping ranges may be employed to suit the needs of a particular implementation.

Figure 8:
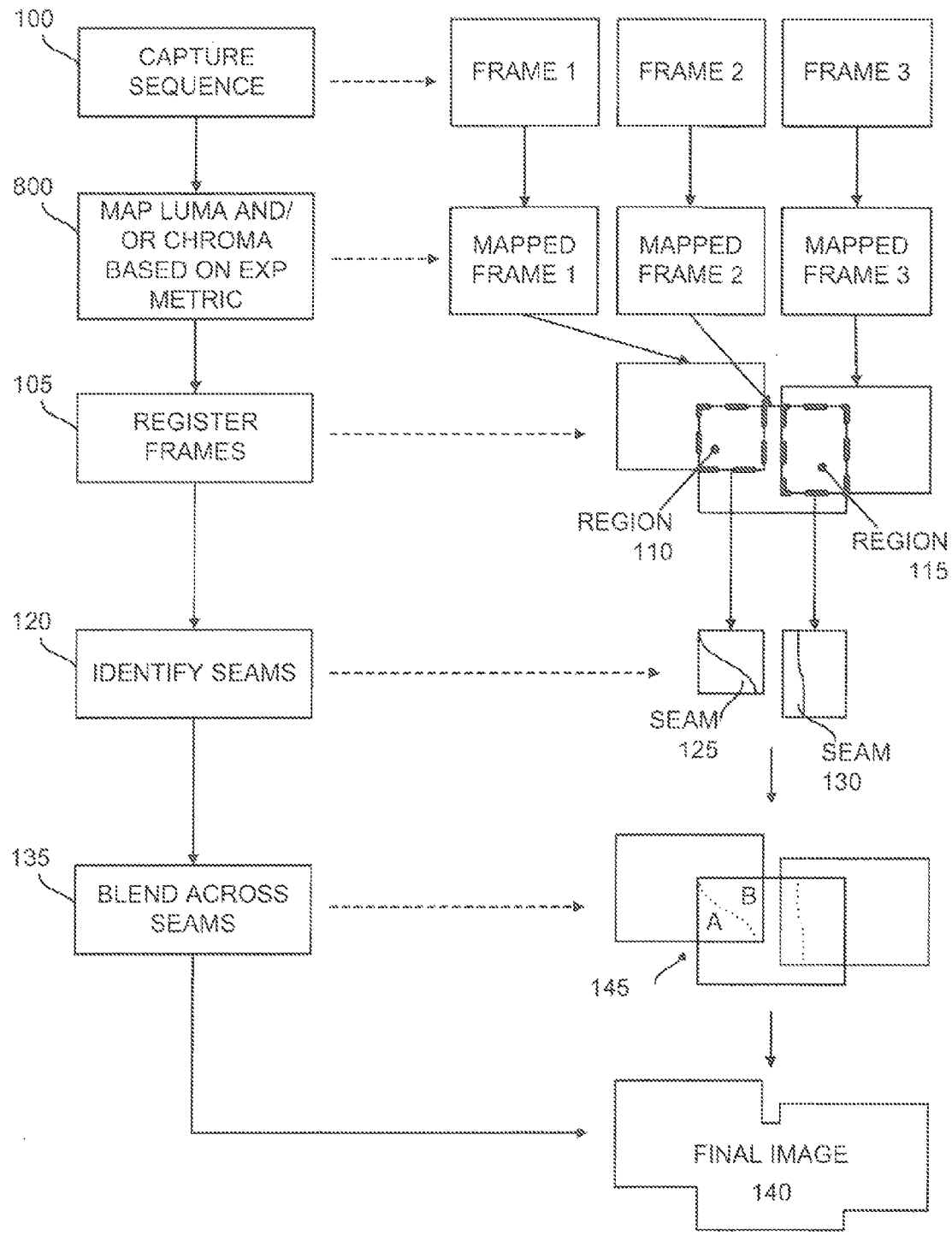
FIG. 8 shows, in flowchart and block diagram form, a wide area-of-view image generation operation utilizing "on-the-fly exposure mapping" blend operations, in accordance with one embodiment.

Referring now to FIG. 8, a wide area-of-view image generation operation utilizing "on-the-fly exposure mapping" blend operations is shown in flowchart and block diagram form, in accordance with one embodiment. As compared to the operation shown in FIG. 1, FIG. 8 includes the additional step of mapping the luma and/or chroma values of the pixels in the image slices based on a determined exposure metric, e.g., an Exposure Ratio value, as described in the various embodiments above (block 800). As may be seen from FIG. 8, this additional step results in the passing of "mapped" frames 1, 2, 3, etc. (or mapped slices) to the image registration, seam identification, and blending steps of the wide area-of-view image generation process.

Figure 9:
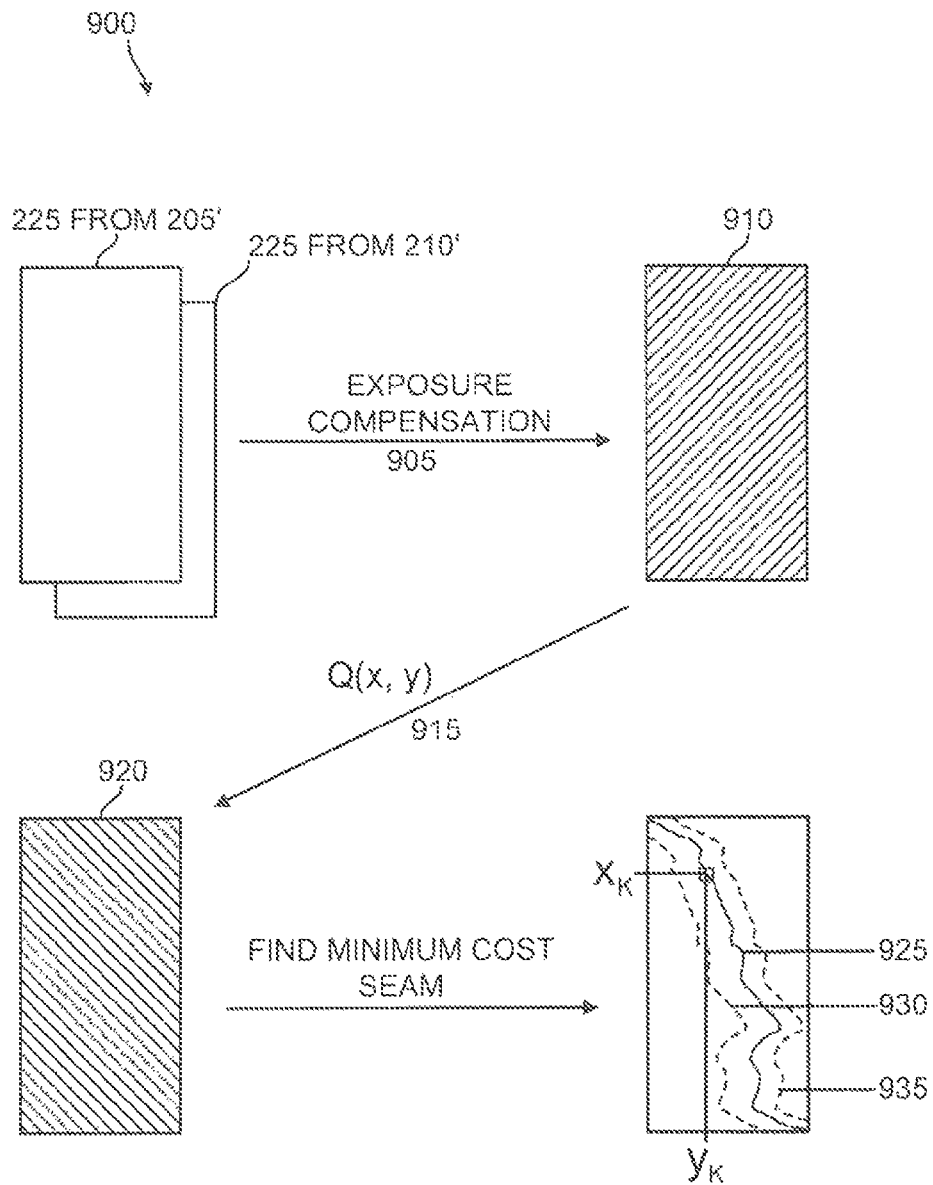
FIG. 9 shows, symbolically, an "on-the-fly exposure mapping" blend operation in accordance with one embodiment.

Referring to FIG. 9, blend operation 900 is illustrated in accordance with one embodiment that obtains the overlap regions' pixel values for each of the slices that have been registered, here slices 205' and 210'. In one such embodiment, the values may be luminance values. In another embodiment, the values may represent chroma values (e.g., CbCr or RGB). An exposure-compensated value 905 may be calculated for every pixel in the incoming slice 210', including those pixels in overlap region 225, as represented by region 910 in FIG. 9, and according to one or more exposure mapping curves, as described above.

A cost value Q(x, y) 915 may be assigned to every pixel (x, y) in overlap region 225, where $x \in \{0, 1, 2, \ldots W-1\}$ and $y \in \{0, 1, 2, \ldots H-1\}$. Cost value Q(x, y) may be thought of as expressing the penalty incurred by the seam passing through that pixel. For instance, Q(x, y) may represent the difference between the color values of the two overlapping pixels in the two slices (on a component-by-component basis or as a combined vector descriptor). Cost Q(x, y) may also represent the absolute difference in the luminance values of the two overlapping pixels in the two slices. While the specific measure Q(x, y) used may vary from one implementation to another, it is generally true that the larger the value of Q(x, y), the more likely the pixels in each slice corresponding to the overlap element at (x, y) are associated with different objects, and hence the seam should not pass through that pixel.

When applied to each corresponding pair of pixels (e.g., pixel 'a' in overlap region 225 from slice 205' and the corresponding pixel 'b' from slice 210'), the result may be cost map 920. Cost map 920 may additionally be filtered via various functions to produce a filtered cost map, as will be discussed further below. Still further details regarding the construction of cost maps and filtered cost maps may be found in the incorporated '950 application and '183 application.

Once cost map 920 has been determined, a minimum cost for a path or "seam" that traverses overlap region 225 from top to bottom may be determined as follows:

$$\text{Cost} = \min\left(\sum_{k=0}^{K-1} Q(x_k, y_k)\right), \quad \text{(EQ. 2)}$$

where $(x_k, y_k)$ represents the coordinates of the k-th seam pixel, and K represents the number of pixels in the seam. Resulting seam 925 represents a path through overlap region 225. Application of various filters and/or weighting functions may be used to create transition band boundaries 930 and 935, in some embodiments, the size of the transition hand may be 64 pixels on either side of seam 925 in order to allow a sufficiently wide blending region to account for potential changes in exposure and, thus, average brightness levels) from slice to slice. Further details regarding the construction of minimum cost seams in wide area-of-view images may be found in the incorporated '950 application and '183 application.

Figure 10:
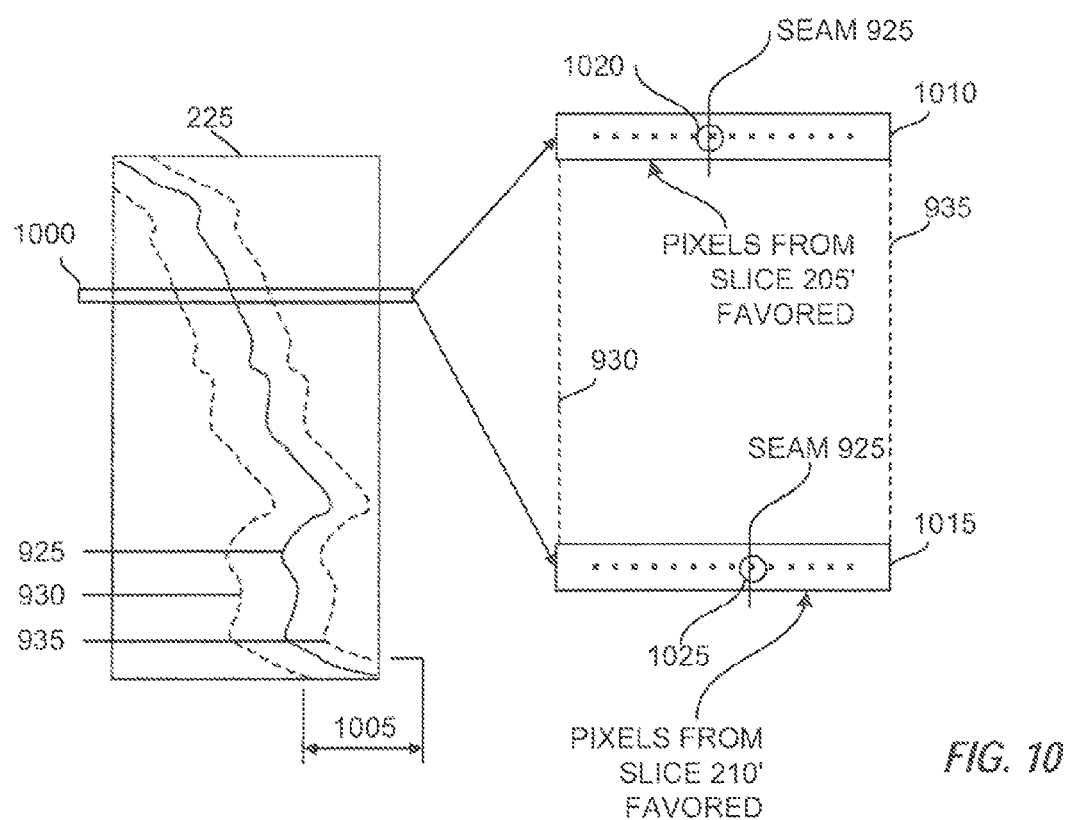
FIG. 10 shows an expanded view of a blend operation's overlap region, in accordance with one embodiment.

Referring to FIG. 10, it will be understood that each of the rows in magnified region 1000 in overlap region 225, having seam or transition boundary 925 and transition band 1005 (defined by guard-band boundaries 930 and 935), actually represents the combination of pixel values from two rows of pixels. E.g., pixel rows 1010 and 1015's left side pixel values may come predominantly from image slice 205' (i.e., the 'left image,' or 'existing,' slice) and their right side pixel values may come predominantly from image slice 210' (i.e., the 'right image,' or 'currently added' slice). Consider, for example, pixel 1020 from row 1010 or pixel 1025 from row 1015. Because pixels 1020 and 1025 lie on seam 925, image seam-matching may adjust their values so that they are the average of the two corresponding pixel values from slice 205' and 210'. In another embodiment, the final value can be the Maximum of the two pixel values co-located on the seam from the two slices. Further details regarding the blending of pixel values within transition band 1005 may be found in the incorporated '950 application and '183 application.

Figure 11:
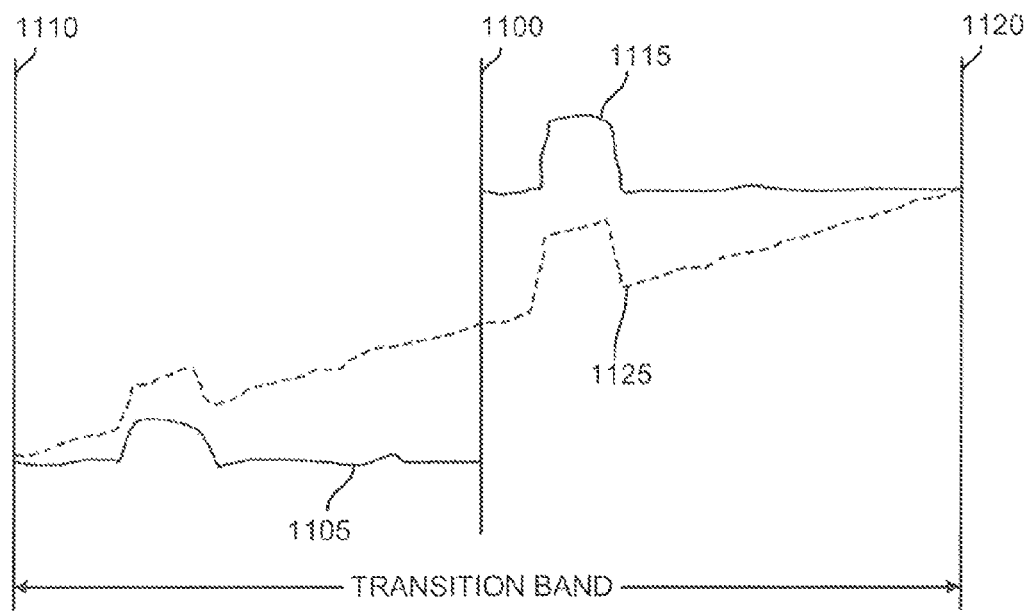
FIG. 11 shows an application of an image seam-matching operation within a transition band, in accordance with one embodiment.

An illustration of this image seam-matching operation within a transition band, in accordance with one embodiment, may be seen in FIG. 11 where image seam-matching has been applied to a portion of a wide area-of-vie image having a line that crosses seam 1100. As shown, left image pixel values 1105 are bounded on the left by guard-band boundary 1110 and on the right by seam 1100. Right image pixel values 1115 are bounded on the right by guard-band boundary 1120 and on the left by seam 1100. Line 1125 represents the output pixel values after image seam-matching has been applied to 1105 and 1115. It should be noted that on either side of seam 1100 the two images pixel values are not merely combined; rather they are smoothly blended, e.g., to result in a higher (for left image pixels 1105) or lower (for right image pixels 1115) placement in the resulting image.

Dynamic Thresholding for Blending of Multiple Images Using Floating Auto Exposure The inventors have discovered additional novel blending techniques to mask the transition from one slice to another, as well as to mask the difference in exposure from once slice to another, for example, in the case of a wide area-of-view image generation embodiment employing the "floating auto exposure" or "floating auto exposure with locking" schemes described in reference to FIGS. 3B and 3C above, respectively.

To implement these novel techniques, the blending process may first perform what essentially amounts to a "reverse" tone mapping process on the currently acquired images slice. Because the blending process is able to determine how much the exposure of the camera has changed for the capture of the currently acquired image slice, it is able to rule out changes in the image that are caused only by the change in exposure—and isolate those changes in the currently acquired image slice that are actually attributable to changes in the image slice's composition. In other words, an object with one gray level in the existing wide area-of-view image should have a different gray level in the newly acquired image slice, based on how much the exposure has changed. Thus, changes that deviate from this difference may be used to aid in determining whether a particular pixel or group of pixels corresponds to the same object in the currently acquired image slice or not. To do so, first, the pixel values in the currently acquired image slice are "mapped back" to the existing wide area-of-view image using the one or exposure and/or chroma mapping techniques described above (i.e., to rule out differences in the values of corresponding pixels across the two images slices being stitched together that are caused by the exposure changes between the image slices), and then the process can perform the difference calculations described above in reference to the cost map 920, and as is described in further detail in the incorporated '950 application and '183 application.

Once the cost map has been created and the seam has been identified in the overlap region between the two slices, an improved blending process may be implemented to perform masking along the seam in the transition band area. If the transitions in this area are not masked effectively, it may result in an undesirable exposure banding or "zebra effect" in the resulting constructed wide area-of-view image, i.e., alternating bright and dark slices that don't blend well into each other.

In some implementations, the transition in brightness between slices may be masked using two distinct blending approaches, which will be referred to herein as "alpha blending" and "simplified Poisson blending." As is explained in the incorporated '950 application and '183 application, the first approach, alpha blending, comprises taking a simple weighted average between the existing image slice and the currently being acquired image slice. For example, the weight given to pixels in the currently being acquired image slice would increase smoothly from left to right (assuming the wide area-of-view image was being captured left to right), and the weight given to pixels from the existing image slice would decrease smoothly from left to right. One problem with alpha blending is that, in the neighborhood of a moving object, e.g., moving leaves on a tree, alpha blending is likely to create a blurring artifact where the two images are combined in the transition band. This type of blurring is referred to herein as "ghosting artifacts." Thus, a second approach to blending may also be employed: a simplified Poisson blending.

According to one embodiment of simplified Poisson blending, only information from the existing wide area-of-view image is considered, without combining the information at any point with information from the currently being acquired image. In a preferred embodiment, the Poisson blending approach does not operate on the intensity values of the image directly; rather, it operates on a gradient map of the image. Once the gradient is calculated for each image being blended, it may be interpolated in order to calculate the final image, which now has the same or similar brightness values as are around the transition band area. Because the information comes from only one image slice, ghosting artifacts may be substantially minimized. Because the gradient map represents the derivative of the image pixel values, it may be integrated to determine the blended values of the pixels located at and around the seam. Further details regarding the use of a Poisson blending approach and gradient map to blend pixel values within transition band 1005 may be found in the incorporated '950 application and '183 application.

As mentioned above, in order to more successfully account for both moving objects and changes in brightness in the overlap region between successively captured images in the construction of a wide area-of-view image, one embodiment described herein combines alpha blending and Poisson blending along the identified seam in an intelligent manner. For example, in areas where there are "broken" (i.e., misaligned) objects in the overlap area, alpha blending is preferred, in order to make a smooth transition between slices. In areas within the overlap region that are smoother, Poisson blending is preferred. The combination between the two blending approaches is done by looking along the seam and calculating the difference between the values of pixels in existing wide area-of-view images and the corresponding pixels in the image slice currently being acquired. Thus, when a large difference is detected between corresponding pixels in the overlap region, the alpha blending approach is favored; whereas, when a smaller difference is detected, the Poisson blending approach is favored.

Figure 12A:
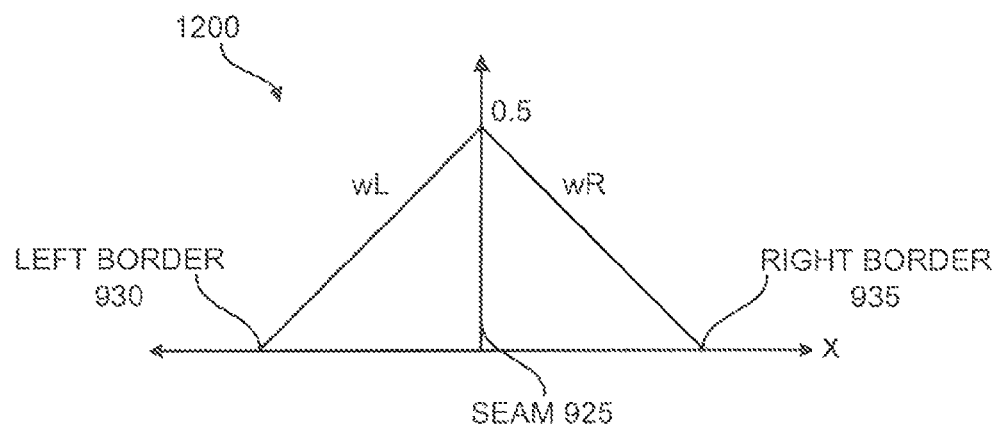
FIG. 12A shows an exemplary weighting function for "dynamic thresholding based on exposure ratio" for high dynamic range, wide area-of-view image construction, in accordance with one embodiment.

In one embodiment, the following equations are employed to alpha blend the pixel values in the overlap region:

On the left side of the seam: $Pnew=P+wL*(S-P)$ (EQ. 3);

On the right side of the seam: $Pnew=S+wR*(P-S)$ (EQ. 4);

where P is the pixel value in the currently existing wide area-of-view image, S is the pixel value in the currently acquired image, and wL, and wR are weighting functions, e.g., as are illustrated in weighting function 1200 of FIG. 12A. As is illustrated by weighting function 1200, the weighting function wL may increase smoothly from the left border 930 of the transition band to the seam 925, whereas weighting function wR may decrease smoothly the seam 925 to the right border 935 of the transition hand, with the two functions being equally weighted (i.e., a weight of 0.5) at the location of seam 925 itself. Any such suitable weighting functions may be chosen for a given implementation, and the weighting function illustrated in FIG. 12A is not intended to be limiting.

Figure 12B:
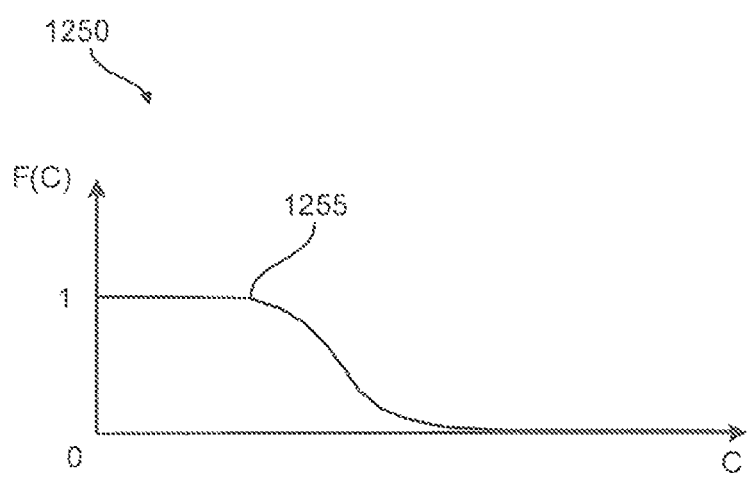
FIG. 12B shows an exemplary cost image weighting function for alpha blending techniques used in conjunction with "dynamic thresholding based on exposure ratio" for high dynamic range, wide area-of-view image construction, in accordance with one embodiment.

Due to wider transition bands that would be employed in a "flea auto exposure" or "floating auto exposure with locking" scheme as compared to a "locked auto exposure" scheme, both blending risks described above (i.e., ghosting and exposure handing) are higher. Thus, in one embodiment, the following equations are employed to more intelligently alpha blend between the two images in the overlap region:

On the left side of the seam: $Pnew=P+wL*f(C)*(S-P)$ (EQ. 5);

On the right side of the seam: $Pnew=S+wR*f(C)*(P-S)$ (EQ. 6);

where f(C) is a function applied to the cost image determined for the overlap region. This cost image is higher where the difference between S and P is higher (also taking into consideration the exposure difference between the two image slices), so the function f(C) is chosen such that f(C) goes to zero for high cost values, and goes to 1 for low cost values, as shown in the exemplary function 1255 illustrated in graph 1250 of FIG. 12B. Any such suitable cost image weighting function, f(C), 1255 may be chosen for a given implementation, and the function 1255 illustrated in FIG. 12B is not intended to be limit g.

As mentioned above, the Poisson blending techniques are favored in areas where a smaller difference is detected between the image slices. Poisson blending substantially eliminates ghosting because it doesn't mix the data from the two images being stitched together, but it may introduce artifacts when long objects are cut by the seam. Thus, a weight function w, may be calculated along the seam that is larger in areas of so-called "labeling errors" (e.g., when a seam cuts through a long object), and smaller in noisy and smoother areas. The signal-to-noise ratio (SNR) metadata of an may also be used in determining what areas of the image have greater noise. For example, in the case of heavy noise regions (i.e., low SNR), Poisson blending techniques may be more heavily favored in order to avoid the risks that alpha blending techniques would "smooth out" the noise along the seam to too great of an extent, thereby making the seam location more visible in the resultant wide area-of-view image.

Once the alpha blending result (A) and the Poisson blending result (P) have been calculated for a given pixel, the results may then be combined, e.g., according to weighting function, w, in order to calculate a new value for the pixel in the resulting wide area-of-view image. In one embodiment, the new value for the pixel, Pnew, is calculated according to the equation:

$$Pnew = wA(1-w)P \qquad (EQ. 7).$$

In one embodiment, the weight, w, for pixels in the transition band may be calculated in two steps. First, for every pixel along the seam, a pre-weight value (w0) may be determined, based on SNR and the difference (D) between the values of the corresponding pixels in the two images being blended. The larger the pixel difference (D), the larger the value that is assigned to the pre-weight value, w0—as a large pixel difference is often found in places where the seam cannot avoid cutting a long horizontal object (e.g., telephone wires, long horizontal structures, building edges, etc.). In such cases, it is preferable to mask the sudden transition by smoothing it via alpha blending techniques. On the other hand, the pixel difference (D) between the corresponding pixel values in the two images may be also caused by noise. In the case of heavy noise regions (i.e., low SNR), it is preferable to emphasize Poisson blending techniques, and hence use a smaller w0 value, in order to avoid the smoothing effect of alpha blending that may have the undesirable consequence of making the seam more visible.

Thus, one exemplary formula for the calculation of the pre-weight value w0, may be: w0=D*SNR (or any similar equation that emphasizes w0 values as D and SNR become larger) (EQ. 8). Since w0 is calculated independently for every pixel along the seam, it may exhibit sudden transitions from one pixel to the next. Such sudden transitions may introduce undesirable visible artifacts, e.g., in the form of short horizontal lines along the transition border. In order to avoid such sudden transitions, w0 values along the seam may be smoothed, e.g., by applying a smoothing low pass filter along the seam. The final weight, w, for a given pixel may then be calculated as a Gaussian-filtered version of pre-weight, i.e., w0, values along the seam.

Figure 13:
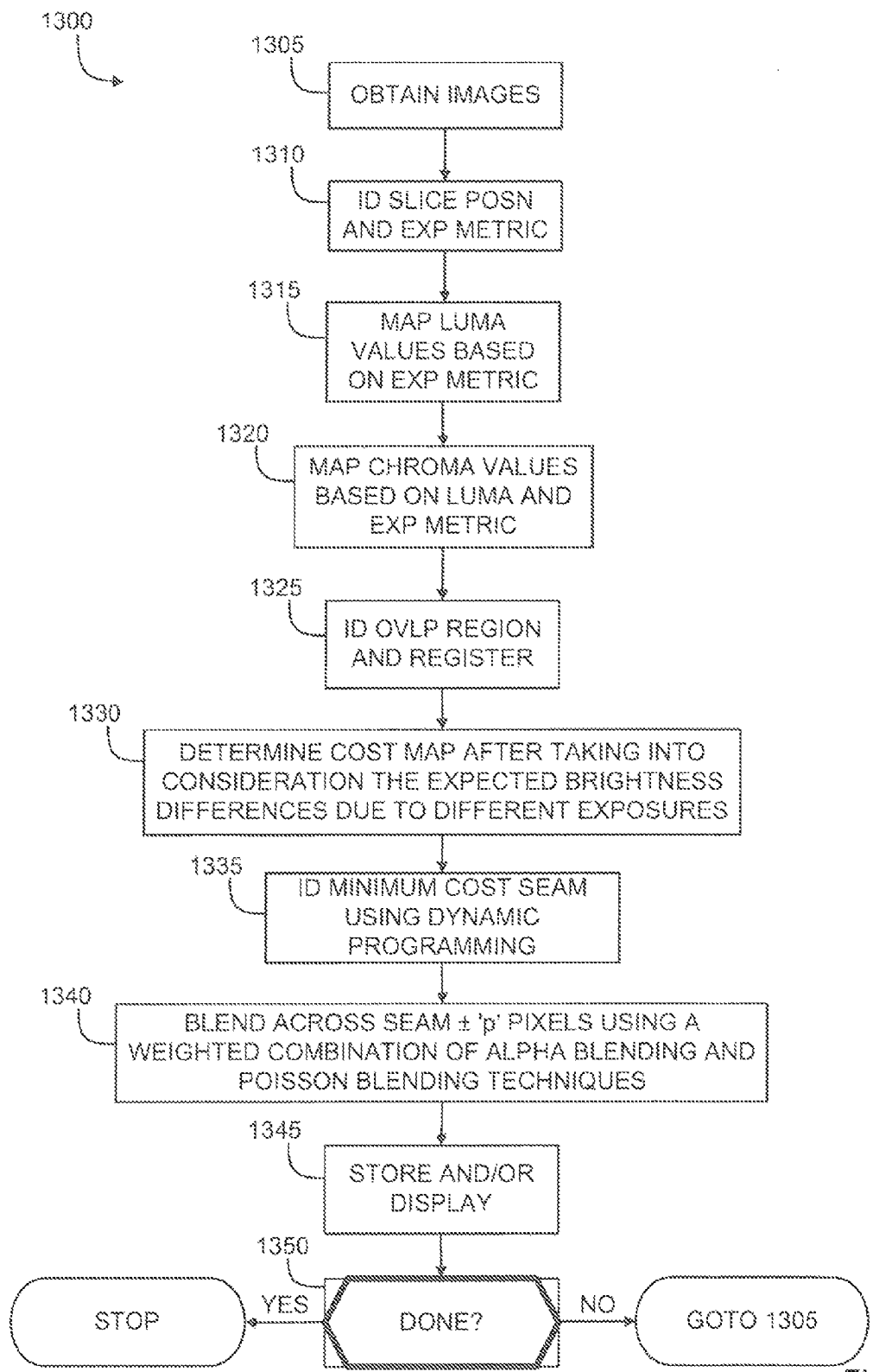
FIG. 13 shows, in flowchart form, a method of "dynamic thresholding based on exposure ratio" for high dynamic range, wide area-of-view image construction utilizing "on-the-fly exposure mapping," in accordance with one embodiment.

Referring now to FIG. 13, the entire blending operation 1300, including the various novel improvements discussed above, is explained in flow chart form. Operation 1300 proceeds in large part in the same way as did registration and blending operation 600 (see FIG. 6). One significant difference is that the blending process utilizes a weighted combination of alpha blending and Poisson blending techniques. This difference may provide a significant operational improvement over prior art techniques wherein, if pixels didn't match from one slice to the next, it was assumed that the mismatching was due to an object moving in the overlap region, and a simple alpha blending process would have been employed. Another aspect of improvement provided by the teachings presented herein over the prior art is that, techniques that use only Poisson blending are likely to introduce significant artifacts in regions where the seam cannot avoid cutting through objects (e.g., long, near-horizontal structures that are not perfectly registered). In such cases, the techniques presented herein may appropriately place greater emphasis on alpha blending techniques in the transition band.

When employing a "floating auto exposure" or "floating auto exposure with locking" scheme, if the pixels are different from slice to slice, the process may look first to information about how the camera's exposure was changed from slice to slice and account for brightness differences due to such exposure changes. Whatever difference is left over may then be assumed to be due to the movement of an object(s) in the overlap region. Further, a wider transition area may be employed in order to more effectively mask the potential brightness changes from image to slice. So, beginning with block 1305 of operation 1300, two images (or image slices) are obtained. An exposure metric, e.g., the aforementioned "Exposure Ratio," as well as the slice's overall position within the wide area-of-view image, may then be calculated for the most recently captured image (block 1310). The luma values for the most recently captured image may then be mapped according to one or more exposure mapping curves, as described above (block 1315). The chroma values for the most recently captured image may also then be desaturated based, at least in part, on the exposure metric and the luma value of the corresponding pixel, as described above (block 1320). An overlap region between the two images may then be identified so that the images may be registered and a registration quality metric may be obtained (block 1325). If the quality metric indicates the registration is acceptable, an initial cost map may be determined, taking into account the expected brightness differences between the slices due to the camera's change in exposure settings during the time between the capture of the two images being registered (block 1330). Details regarding how the process may proceed if the quality metric indicates that the registration is not acceptable may be found in the incorporated '183 application, and thus are not discussed further here. Based on the final cost map, a minimum cost seam can be determined (block 1335). Details regarding the construction of a cost map and determination of a minimum cost seam may be found above and in the incorporated '950 application and '183 application. The two images may then be blended together by blending ±'p' overlapping pixels across the identified minimum cost seam, e.g., by using a weighted combination of alpha blending and Poisson blending (block 1340). With blending operations complete, the blended image may be stored or displayed (block 1345). If all desired images have been registered and blended (the "YES" prong of block 1350), operation 1300 is complete. If additional images remain to be combined (the "NO" prong of block 1350), operation 1300 continues at block 1305 where the next image to be combined may be obtained.

Figure 14:
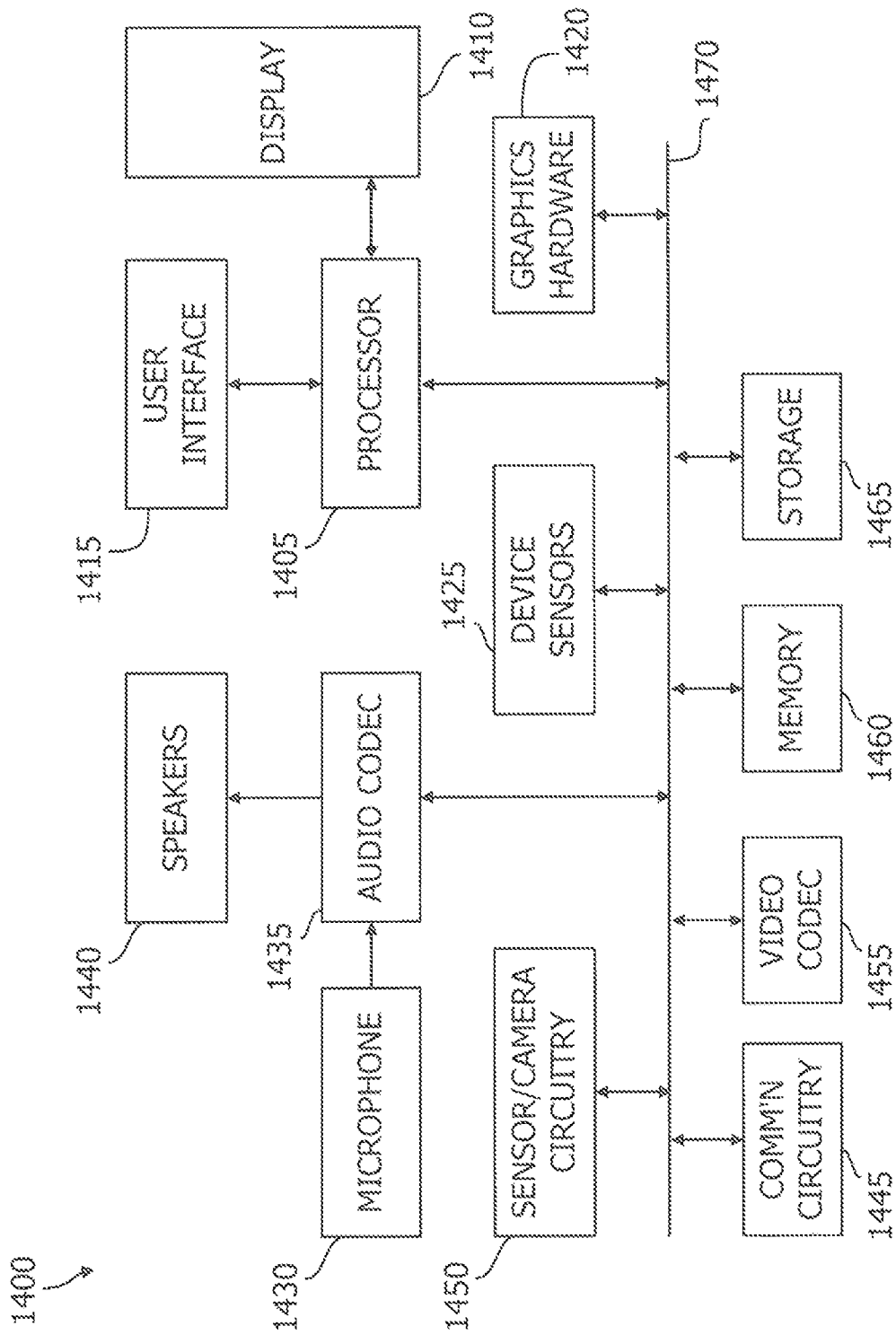
FIG. 14 shows, in block diagram form, an illustrative electronic device that may implement one or more of the described image blending operations using a floating auto exposure "Exposure Ratio."

Referring to FIG. 14, a simplified functional block diagram of an illustrative electronic device 1400 is shown according to one embodiment. Electronic device 1400 may include processor 1405, display 1410, user interface 1415, graphics hardware 1420, device sensors 1425 (e.g., proximity sensor/ambient light sensor, accelerometer and/or gyroscope), microphone 1430, audio codec(s) 1435, speaker(s) 1440, communications circuitry 1445, digital image capture unit 1450, video codec(s) 1455, memory 1460, storage 1465, and communications bus 1470. Electronic device 1400 may be, for example, a personal digital assistant (PDA), personal music player, mobile telephone, or a notebook, laptop or tablet computer system.

Processor 1405 may be any suitable programmable control device capable of executing instructions necessary to carry out or control the operation of the many functions performed by device 1400 (e.g., such as the generation and/or processing of images in accordance with operations in any one or more of FIGS. 4-13). Processor 1405 may, for instance, drive display 1410 and receive user input from user interface 1415 which can take a variety of forms, such as a button, keypad, dial, a click wheel, keyboard, display screen and/or a touch screen. Processor 1405 may be a system-on-chip such as those found in mobile devices and include a dedicated graphics processing unit (GPU). Processor 1405 may be based on reduced instruction-set computer (RISC) or complex instruction-set computer (CISC) architectures or any other suitable architecture and may include one or more processing cores. Graphics hardware 1420 may be special purpose computational hardware for processing graphics and/or assisting processor 1405 process graphics information. In one embodiment, graphics hardware 1420 may include a programmable graphics processing unit (GPU).

Sensor and camera circuitry 1450 may capture still and video images that may be processed to generate wide angle-of-view images, at least in part, by video codec(s) 1455 and/or processor 1405 and/or graphics hardware 1420, and/or a dedicated image processing unit incorporated within circuitry 1450. Images so captured may be stored in memory 1460 and/or storage 1465. Memory 1460 may include one or more different types of media used by processor 1405, graphics hardware 1420, and image capture circuitry 1450 to perform device functions. For example, memory 1460 may include memory cache, read-only memory (ROM), and/or random access memory (RAM). Storage 1465 may store media (e.g., audio, image and video files), computer program instructions or software, preference information, device profile information, and any other suitable data. Storage 1465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1460 and storage 1465 may be used to retain computer program instructions or code organized into one or more modules and written in any desired computer programming language. When executed by, for example, processor 1405 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified in FIGS. 6 and 13 may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
   obtain a first image of a scene from a camera at a first time using a first exposure value;
   obtain a second image of the scene from the camera at a second, later time using a second exposure value, wherein the first and second images share an overlapping region, the overlapping region comprising a plurality of pixels from the first image and a corresponding plurality of pixels from the second image, each pixel having a pixel value comprising one or more of a luminance value and a chrominance value;
   determine an exposure ratio value based on the first exposure value and the second exposure value;
   determine an updated pixel value for one or more of the plurality of pixels in the second image based, at least in part, on the determined exposure ratio value;
   update the pixel values of the one or more pixels from the plurality of pixels in the second image to be equal to the corresponding determined updated pixel values; and
   combine at least some of the pixels having the updated pixel values from the second image with corresponding pixels from the first image to generate a wide area-of-view image.

2. The non-transitory program storage device of claim 1, wherein the exposure ratio value comprises a ratio of the second exposure value to the first exposure value.

3. The non-transitory program storage device of claim 1, wherein the instructions to cause the programmable control device to determine an updated pixel value for one or more of the plurality of pixels in the second image comprise instructions to cause the programmable control device to:
   select an exposure mapping curve based, at least in part, on the determined exposure ratio value; and
   apply the selected exposure mapping curve to at least some of the one or more pixels from the plurality of pixels in the second image.

4. The non-transitory program storage device of claim 3, wherein a first exposure mapping curve is selected when the second exposure value is larger than the first exposure value, and a second exposure mapping curve is selected when the second exposure value is smaller than the first exposure value.

5. The non-transitory program storage device of claim 1, wherein the one or more of the plurality of pixels in the second image for which an updated value is determined comprise one of more pixels located in a central slice of the second image.

6. The non-transitory program storage device of claim 1, further comprising instructions to cause the programmable control device to determine an upper limit exposure value and a lower limit exposure value of the camera in response to capturing the first image and before capturing the second image, wherein the upper limit exposure value and the lower limit exposure value are based on the first exposure value.

7. The non-transitory program storage device of claim 6, wherein the instructions to cause the programmable control device to determine an updated pixel value for one or more of the plurality of pixels in the second image further comprise instructions to cause the programmable control device to:
   determine a desaturation scale metric based, at least in part, on the determined exposure ratio value and a calculated gain value; and apply the desaturation scale metric to at least some of the one or more pixels in the second image.

8. The non-transitory program storage device of claim 7, wherein the calculated gain value comprises a difference between a first gain that was applied during a capture of the second image and a second gain that would have been applied during the capture of the second image when the second exposure value is at least equal to the lower limit exposure value and at most equal to the upper limit exposure value.

9. The non-transitory program storage device of claim 6, wherein the second exposure value is at least equal to the lower limit and at most equal to the upper limit.

10. A method, comprising:
   obtaining a first image of a scene from a camera at a first time using a first exposure value;
   obtaining a second image of the scene from the camera at a second, later time using a second exposure value, wherein the first and second images share an overlapping region, the overlapping region comprising a plurality of pixels from the first image and a corresponding plurality of pixels from the second image, each pixel having a pixel value comprising one or more of a luminance value and a chrominance value;
   determining an exposure ratio value based on the first exposure value and the second exposure value;
   determining an updated pixel value for one or more of the plurality of pixels in the second image based, at least in part, on the determined exposure ratio value;
   updating the pixel values of the one or more pixels from the plurality of pixels in the second image to be equal to the corresponding determined updated pixel values; and
   combining at least some of the pixels having the updated pixel values of the second image with corresponding pixels from the first image to generate a wide area-of-view image.

11. The method of claim 10, wherein the exposure ratio value comprises a ratio of the second exposure value to the first exposure value.

12. The method of claim 10, wherein determining an updated pixel value further comprises:
   selecting an exposure mapping curve based, at least in part, on the determined exposure ratio value; and
   applying the selected exposure mapping curve to at least some of the one or more pixels from the plurality of pixels in the second image.

13. The method of claim 12, wherein a first exposure mapping curve is selected when the second exposure value is larger than the first exposure value, and a second exposure mapping curve is selected when the second exposure value is smaller than the first exposure value.

14. The method of claim 10, further comprising:
   determining an upper limit exposure value and a lower limit exposure value of the camera in response to capturing the first image and before capturing the second image, wherein the upper limit exposure value and the lower limit exposure value are based on the first exposure value.

15. The method of claim 14, wherein determining an updated pixel value for one or more of the plurality of pixels in the second image further comprises:
   determining a desaturation scale metric based, at least in part, on the determined exposure ratio value and a calculated gain value; and
   applying the desaturation scale metric to at least some of the one or more pixels in the second image.

16. The method of claim 15, wherein the calculated gain value comprises a difference between a first gain that was applied during a capture of the second image and a second gain that would have been applied during the capture of the second image when the second exposure value is at least equal to the lower limit exposure value and at most equal to the upper limit exposure value.

17. The method of claim 14, wherein the second exposure value is at least equal to the lower limit and at most equal to the upper limit.

18. A system, comprising:
   an image capture device;
   a memory operatively coupled to the image capture device and having, stored therein, computer program code;
   a display element operatively coupled to the memory; and
   a programmable control device operatively coupled to the memory and the display element and comprising instructions stored thereon to cause the programmable control device to:
   obtain a first image of a scene from the image capture device at a first time using a first exposure value;
   obtain a second image of the scene from the image capture device at a second, later time using a second exposure value, wherein the first and second images share an overlapping region, the overlapping region comprising a plurality of pixels from the first image and a corresponding plurality of pixels from the second, each pixel having a pixel value comprising one or more of a luminance value and a chrominance value;
   determine an exposure ratio value based on the first exposure value and the second exposure value;
   determine an updated pixel value for one or more of the plurality of pixels in the second image based, at least in part, on the determined exposure ratio value;
   update the pixel values of the one or more pixels from the plurality of pixels in the second image to be equal to the corresponding determined updated pixel values;
   combine at least some of the pixels having the updated pixel values from the second image with corresponding pixels from the first image to generate a wide area-of-view image; and
   store the wide area-of-view image in the memory.

19. The system of claim 18, wherein the exposure ratio value comprises a ratio of the second exposure value to the first exposure value.

20. The system of claim 18, wherein the instructions to cause the programmable control device to determine an updated pixel value for one or more of the plurality of pixels in the second image comprise instructions to cause the programmable control device to:
   select an exposure mapping curve based, at least in part, on the determined exposure ratio value; and
   apply the selected exposure mapping curve to at least some of the one or more pixels from the plurality of pixels in the second image.

21. The system of claim 18, further comprising instructions to cause the programmable control device to determine an upper limit exposure value and a lower limit exposure value of the image capture device in response to capturing the first image and before capturing the second image, wherein the upper limit exposure value and the lower limit exposure value are based on the first exposure value.

22. The system of claim 21, wherein the second exposure value is at least equal to the lower limit and at most equal to the upper limit.

23. The system of claim 18, wherein the instructions to cause the programmable control device to determine an updated pixel value for one or more of the plurality of pixels in the second image further comprise instructions to cause the programmable control device to:
   determine a desaturation scale metric based, at least in part, on the determined exposure ratio value and a calculated gain value; and
   apply the desaturation scale metric to at least some of the one or more pixels in the second image.

* * * * *

UNITED STATES PATENT AND TRADEMARK OFFICE
CERTIFICATE OF CORRECTION

PATENT NO. : 9,832,378 B2
APPLICATION NO. : 13/911243
DATED : November 28, 2017
INVENTOR(S) : Frank Doepke et al.

Page 1 of 1

It is certified that error appears in the above-identified patent and that said Letters Patent is hereby corrected as shown below:

In the Claims

Claim 9 at Column 19, Line 13 should read:
-- lower limit exposure value and at most equal to the upper limit exposure value. --

Claim 17 at Column 20, Lines 9-10 should read:
-- value is at least equal to the lower limit exposure value and at most equal to the upper limit exposure value. --

Claim 18 at Column 20, Line 28-29 should read:
-- corresponding plurality of pixels from the second image, each pixel --

Claim 22 at Column 20, Lines 66-67 should read:
-- value is at least equal to the lower limit exposure value and at most equal to the upper limit exposure value. --

Signed and Sealed this
Twentieth Day of November, 2018

Andrei Iancu
*Director of the United States Patent and Trademark Office*